US008171366B2

(12) United States Patent
Suga

(10) Patent No.: US 8,171,366 B2
(45) Date of Patent: May 1, 2012

(54) METHOD OF RETRANSMISSION CONTROL IN WIRELESS RELAY SYSTEM, WIRELESS RELAY STATION, AND WIRELESS BASE STATION

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 12/570,875

(22) Filed: Sep. 30, 2009

(65) Prior Publication Data

US 2010/0017672 A1  Jan. 21, 2010

Related U.S. Application Data

(63) Continuation of application No. PCT/JP2007/058464, filed on Apr. 18, 2007.

(51) Int. Cl.
*G06F 11/00* (2006.01)
(52) U.S. Cl. ......................... 714/748
(58) Field of Classification Search ............... 714/748
See application file for complete search history.

(56) References Cited

U.S. PATENT DOCUMENTS

| 5,555,266 | A | * | 9/1996 | Buchholz et al. | 370/347 |
|---|---|---|---|---|---|
| 2006/0046643 | A1 | | 3/2006 | Izumikawa et al. | |
| 2007/0275656 | A1 | * | 11/2007 | Chang et al. | 455/9 |
| 2008/0240014 | A1 | * | 10/2008 | Chang et al. | 370/315 |
| 2009/0086666 | A1 | * | 4/2009 | Guvenc et al. | 370/328 |
| 2009/0313518 | A1 | * | 12/2009 | Shen et al. | 714/749 |
| 2011/0022917 | A1 | * | 1/2011 | Wang et al. | 714/748 |

FOREIGN PATENT DOCUMENTS

JP   2006074325   3/2006

OTHER PUBLICATIONS

International Search Report dated Jul. 24, 2007.
IEEE Std 802.16-2004 IEEE Standard for Local and metropolitan area networks, Part 16: Air Interface for Fixed Broadband Wireless Access Systems, IEEE Computer Society and the IEEE Microwave Theory and Techniques Society, Oct. 1, 2004.
IEEE Std 802.16e-2005 and IEEE Std 802.16-2004/Cor1-2005 IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer Society and the IEEE Microwave Theory and Techniques Society, p. 403-410, 485-489 Feb. 28, 2006.
Eugene Visotsky, et al. "Proposal for Centralized HARQ Retransmission Scheduling", IEEE 802.16 Broadband Wireless Access Working Group, IEEE 802.16j-07/226rl, full text, Mar. 5, 2007.
Kanchei Loa, et al. "HARQ in Multi-hop Relay System", IEEE 802.16 Broadband Wireless Access Working Group, IEEE 802.16j-07/185r3, full text, Apr. 12, 2007.

* cited by examiner

*Primary Examiner* — Bryce Bonzo
(74) *Attorney, Agent, or Firm* — Murphy & King, P.C.

(57) ABSTRACT

If a reception result from an MS for the previous transmission data is a reception failure, second allocation information for retransmitting the previous transmission data is generated by an RS based on allocation information on a wireless resource for transmission of new data. The second allocation information and the previous transmission data are transmitted to the MS, and the new data is buffered.

20 Claims, 22 Drawing Sheets

FIG. 4

| STATUS | ACK/NAK TO DATA #n OF RS | ACK/NAK TO DATA #n-1 OF MS | BS PROCESSING OPERATION |
|---|---|---|---|
| S0 | ACK | ACK | SEND SCHEDULING INFO. SEND NEW HARQ DATA |
| S1 | ACK | NAK | SEND SCHEDULING INFO. |
| S2 | NAK | ACK | SEND SCHEDULING INFO. RESEND HARQ DATA |
| S3 | NAK | NAK | SEND SCHEDULING INFO. RESEND HARQ DATA |

FIG. 5

| STATUS | ACK/NAK FROM MS | DATA IN BUFFER? | RECEPTION FROM BS | PROCESSING OPERATION OF RS | INVERSION FROM PREVIOUS AI_SN? |
|---|---|---|---|---|---|
| S0 | — | NO | RECEIVE SCHEDULING INFO. HARQ DATA RECEPTION SUCCEEDED | RELAY HARQ DATA TO MS | NO(※) |
| | | | RECEIVE SCHEDULING INFO. HARQ DATA RECEPTION FAILED | NO RELAY | YES(※) |
| S1 | ACK | NO | RECEIVE SCHEDULING INFO. HARQ DATA RECEPTION SUCCEEDED | RELAY HARQ DATA TO MS | YES |
| | | | RECEIVE SCHEDULING INFO. HARQ DATA RECEPTION FAILED | RESEND PREVIOUS HARQ DATA TO MS | NO |
| S2 | NAK | NO | RECEIVE SCHEDULING INFO. HARQ DATA RECEPTION SUCCEEDED | RESEND PREVIOUS HARQ DATA TO MS BUFFER HARQ DATA FROM BS | NO |
| | | | RECEIVE SCHEDULING INFO. HARQ DATA RECEPTION FAILED | RESEND PREVIOUS HARQ DATA TO MS | NO |
| S3 | ACK | YES | RECEIVE SCHEDULING INFO. | SEND HARQ DATA WITHIN BUFFER TO MS | YES |
| S4 | NAK | YES | RECEIVE SCHEDULING INFO. | RESEND PREVIOUS HARQ DATA TO MS | NO |

(※) INVERSION FROM AI_SN INDICATED BY SCHEDULING INFO.

FIG. 8

| STATUS | RECEPTION CONDITION OF DATA #n IN RS | RECEPTION CONDITION OF DATA #n IN BS | PROCESSING OPERATION TO RS |
|---|---|---|---|
| S0 | OK | OK | ALLOCATE HARQ DATA RELAY |
| S1 | OK | NG | ALLOCATE HARQ DATA RESEND |
| S2 | NG | — | ALLOCATE HARQ DATA RESEND |

FIG. 9

| STATUS | DATA FROM MS | REQUEST OF RESENDING IMMEDIATE PREVIOUS DATA FROM BS | PROCESSING OPERATION OF RS | INVERSION FROM PREVIOUS AI_SN? |
|---|---|---|---|---|
| S0 | OK | NO | NEW DATA SEND REQUEST | YES |
|  |  | YES | NEW DATA RESEND REQUEST | NO |
| S1 | NG | NO | NEW DATA RESEND REQUEST | NO |
|  |  | YES | NEW DATA RESEND REQUEST | NO |

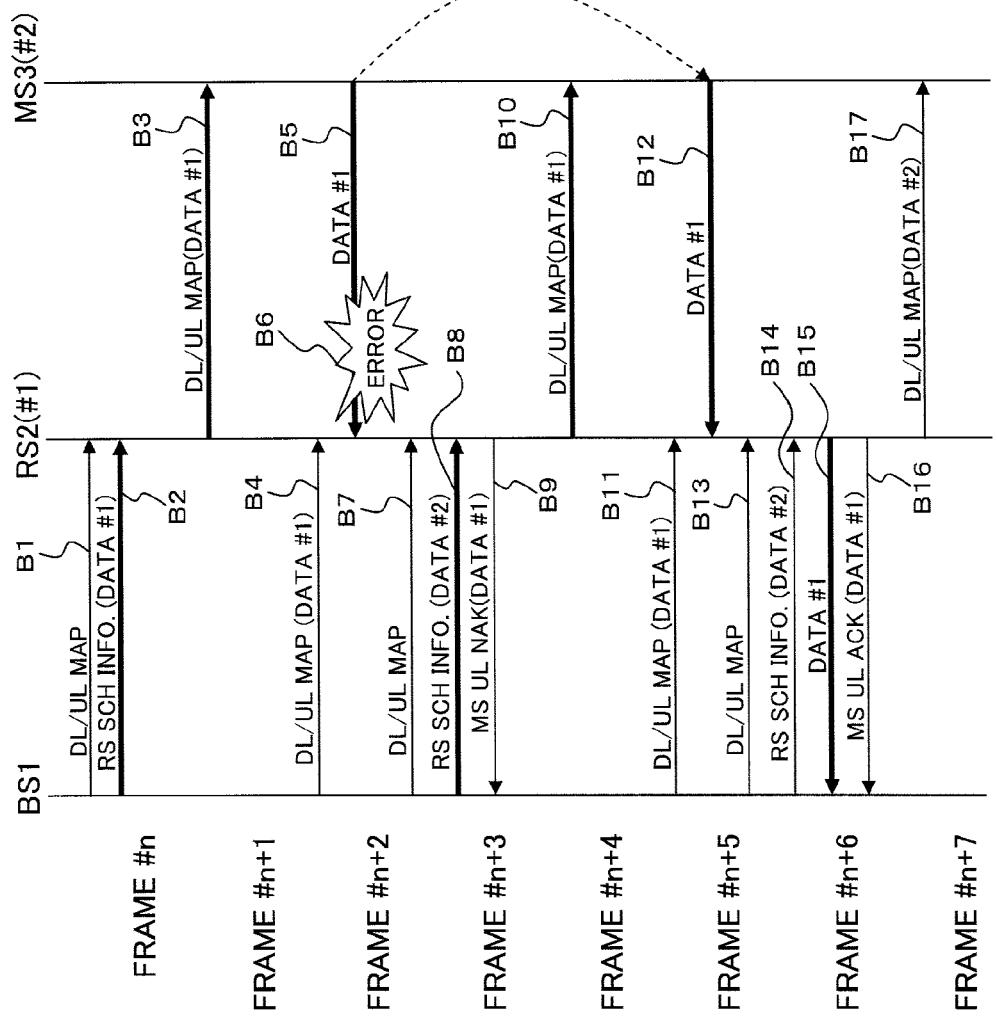

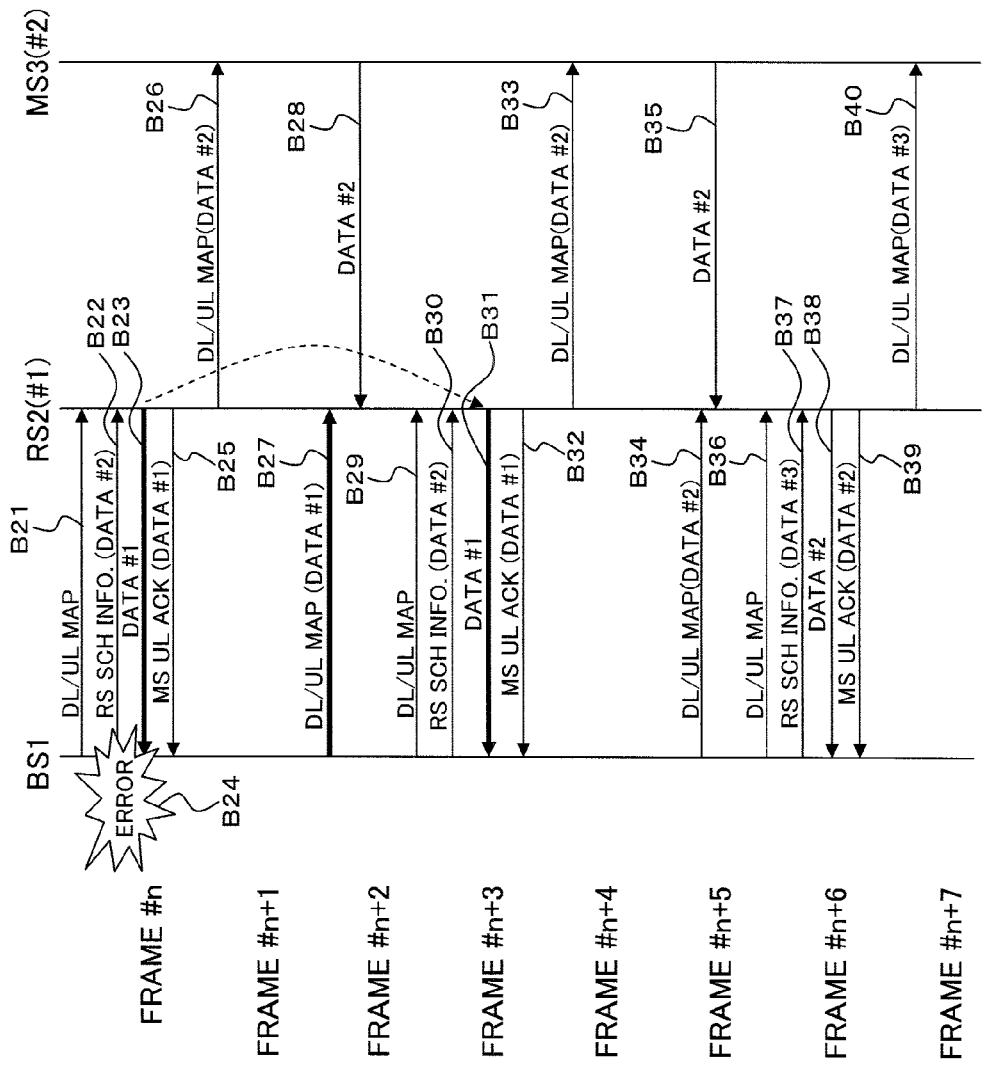

FIG. 13

| STATUS | ACK/NAK TO DATA #n OF RS1 | ACK/NAK TO DATA #n-1 OF RS2 | ACK/NAK TO DATA #n-2 OF MS | BS PROCESSING OPERATION |
|---|---|---|---|---|
| S0 | ACK | ACK | ACK | SEND SCHEDULING INFO. (R1, R2) SEND NEW HARQ DATA |
| S1 | ACK | ACK | NAK | SEND SCHEDULING INFO. (R2) |
| S2 | ACK | NAK | ACK | SEND SCHEDULING INFO. (R1, R2) |
| S3 | ACK | NAK | NAK | SEND SCHEDULING INFO. (R1, R2) |
| S4 | NAK | ACK | ACK | SEND SCHEDULING INFO. (R1, R2) RESEND HARQ DATA |
| S5 | NAK | ACK | NAK | SEND SCHEDULING INFO. (R1, R2) RESEND HARQ DATA |
| S6 | NAK | NAK | ACK | SEND SCHEDULING INFO. (R1, R2) RESEND HARQ DATA |
| S7 | NAK | NAK | NAK | SEND SCHEDULING INFO. (R1, R2) RESEND HARQ DATA |

FIG. 14

| STATUS | ACK/NAK FROM SUBSEQUENT NODE | DATA IN BUFFER? | RECEPTION FROM BS | PROCESSING OPERATION OF RS | INVERSION FROM PREVIOUS AI_SN? |
|---|---|---|---|---|---|
| S0 | — | NO | RECEIVE SCHEDULING INFO. HARQ DATA RECEPTION SUCCEEDED | RELAY HARQ DATA TO MS | NO(※) |
| | | | RECEIVE SCHEDULING INFO. HARQ DATA RECEPTION FAILED | UPDATE DL/UL MAP NO RELAY | YES(※) |
| S1 | ACK | NO | RECEIVE SCHEDULING INFO. HARQ DATA RECEPTION SUCCEEDED | RELAY HARQ DATA TO MS | YES |
| | | | RECEIVE SCHEDULING INFO. HARQ DATA RECEPTION FAILED | RESEND PREVIOUS HARQ DATA TO MS | NO |
| S2 | NAK | NO | RECEIVE SCHEDULING INFO. HARQ DATA RECEPTION SUCCEEDED | RESEND PREVIOUS HARQ DATA TO MS BUFFER HARQ DATA FROM BS | NO |
| | | | RECEIVE SCHEDULING INFO. HARQ DATA RECEPTION FAILED | RESEND PREVIOUS HARQ DATA TO MS | NO |
| S3 | ACK | YES | RECEIVE SCHEDULING INFO. | SEND HARQ DATA WITHIN BUFFER TO MS | YES |
| S4 | NAK | YES | RECEIVE SCHEDULING INFO. | RESEND PREVIOUS HARQ DATA TO MS | NO |

(※) INVERSION FROM AI_SN INDICATED BY SCHEDULING INFO.

FIG. 16

| STATUS | RECEPTION CONDITION OF DATA #N IN SUBORDINATE RS | RECEPTION CONDITION OF DATA #N IN BS | PROCESSING OPERATION TO RS |
|---|---|---|---|
| S0 | OK | OK | SEND SCHEDULING INFO. ALLOCATE HARQ DATA RELAY |
| S1 | OK | NG | SEND SCHEDULING INFO. ALLOCATE HARQ DATA RESEND |
| S2 | NG | — | SEND SCHEDULING INFO. ALLOCATE HARQ DATA RESEND |

FIG. 17

| STATUS | DATA FROM MS | REQUEST OF RESENDING IMMEDIATE PREVIOUS DATA FROM BS | PROCESSING OPERATION OF RS | INVERSION FROM PREVIOUS AI_SN? |
|---|---|---|---|---|
| S0 | OK | NO | NEW DATA SEND REQUEST | YES |
|  |  | YES | NEW DATA RESEND REQUEST | NO |
| S1 | NG | NO | NEW DATA RESEND REQUEST | NO |
|  |  | YES | NEW DATA RESEND REQUEST | NO |

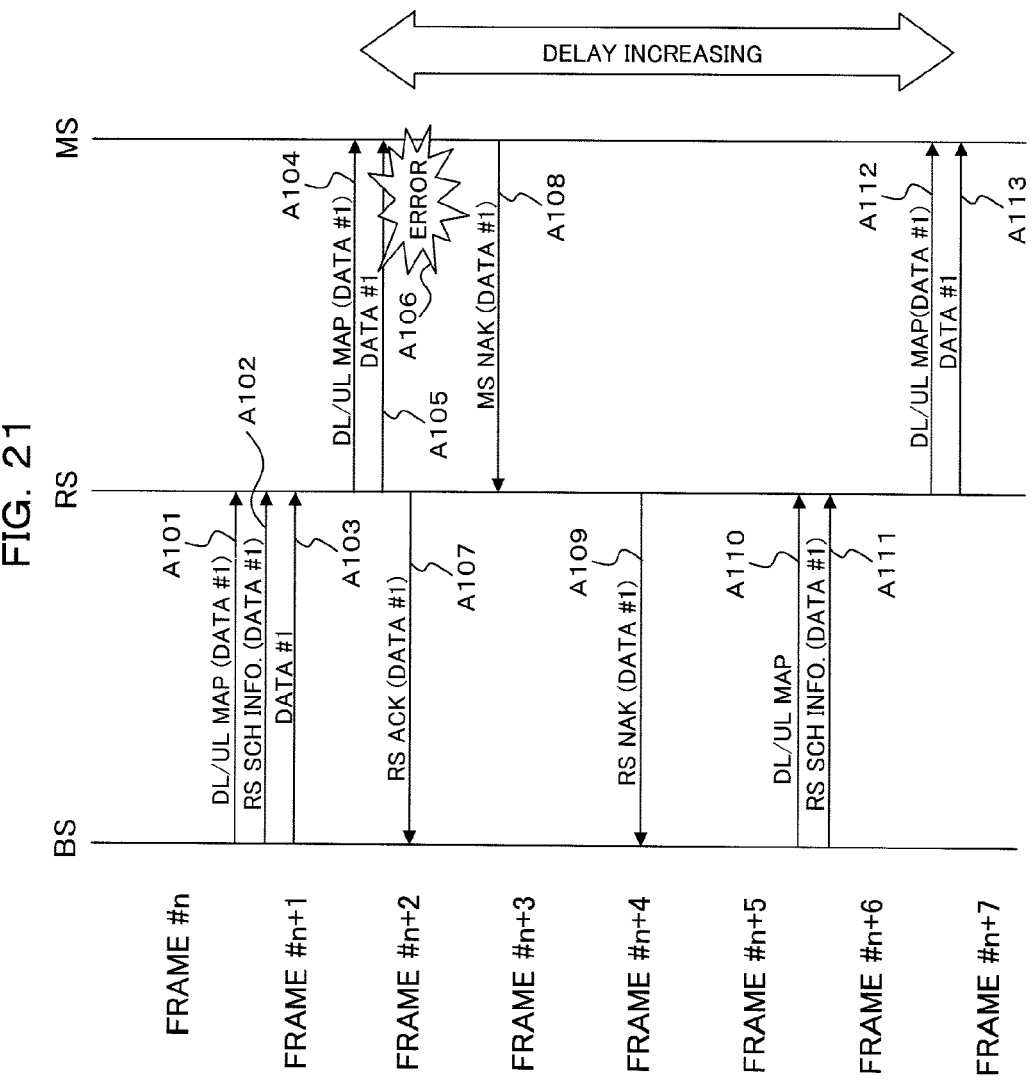

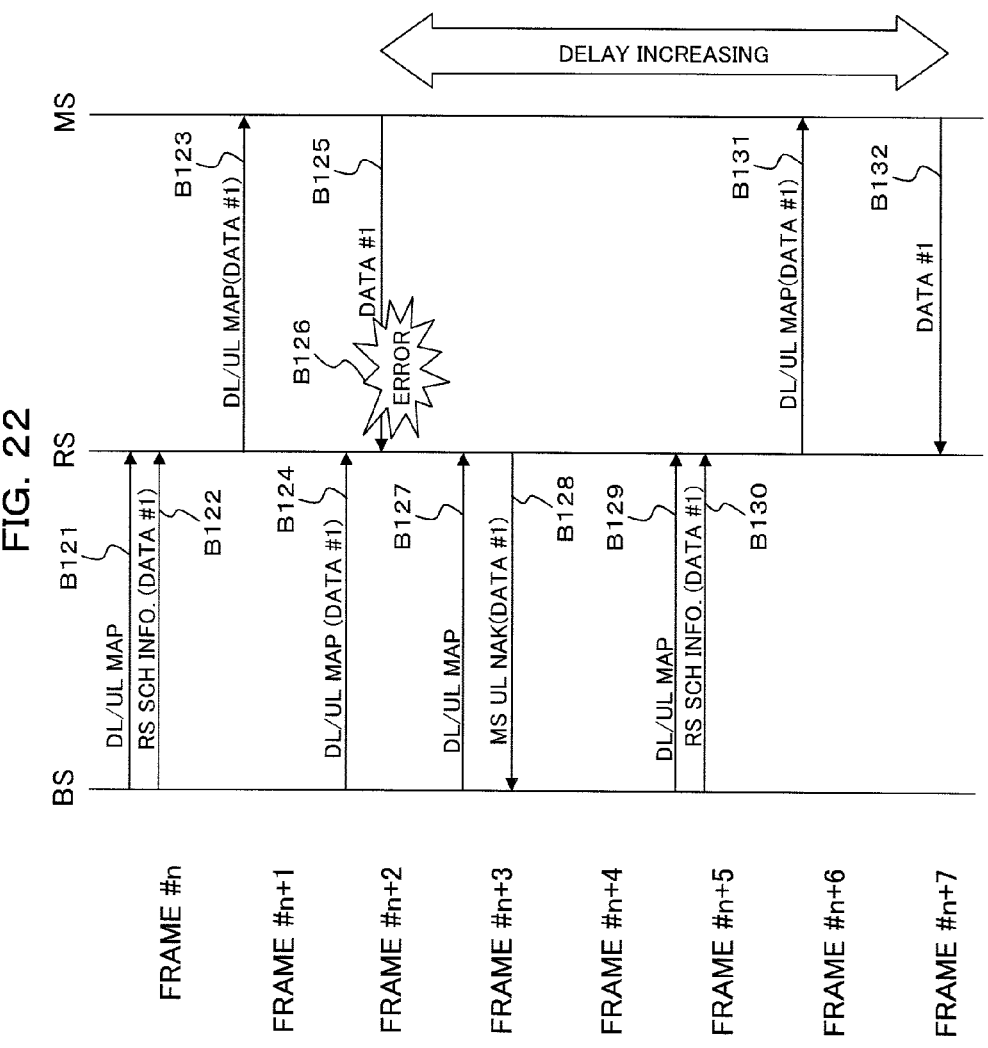

METHOD OF RETRANSMISSION CONTROL IN WIRELESS RELAY SYSTEM, WIRELESS RELAY STATION, AND WIRELESS BASE STATION

CROSS-REFERENCE TO RELATED APPLICATION

This application is a continuation Application of a PCT international application No. PCT/JP2007/58464 filed on Apr. 18, 2007 in Japan, the entire contents of which are incorporated by reference.

FIELD

The embodiments discussed herein are related to a method of retransmission control in a wireless relay system, a wireless relay station, and a wireless base station.

BACKGROUND

The IEEE802.16 Working Group (WG) defines point-to-multipoint (P-MP) type communication schemes in which multiple wireless terminals (MSs: mobile stations) can connect to a wireless base station (BS). The IEEE802.16 WG (working group) defines two standards: the IEEE802.16d (802.16-2004) primarily for stationary communications and the IEEE802.16e (IEEE802.16e-2005) for mobile communications (see Non-Patent References 1 and 2 that will be described later) These standards define multiple physical layers, and techniques such as orthogonal frequency division multiplexing (e.g., the OFDM, OFDMA) are primarily used.

FIG. 19 illustrates a service image (example of the configuration of a wireless communication system) which is compliant to the IEEE802.16d/e. As depicted in FIG. 19, a system compliant to the IEEE802.16d/e is based on a point-to-multipoint (P-MP) type connection in which multiple MSs connect to one BS.

However, in such a service topology in which a BS and MSs connect each other in the P-MP manner, the service area is limited to the coverage area (cell) of the BS, resulting in a reduced communication rate at the cell edge.

For addressing this issue, the IEEE802.16 WG founded a task group (IEEE802.16j) for studying wireless relay stations (RSs) that relay communications between a BS and MSs, and the study is underway. FIG. 20 illustrates an example of the system configuration in which an RS is introduced. As depicted FIG. 20, the service area of the BS can be extended through the RS by carrying out communications with the MS that is located in the area outside the coverage of the BS through the RS.

On the other hand, in the technique disclosed in Patent Reference 1 described later, in a relay system using an RS, a BS determines scheduling for communications between the RS and an MS. The RS receives scheduling information on communication between the RS and the MS (information related to the configuration of wireless frames, allocation information on wireless resources (a DL/UL MAP in the OFDM scheme and the OFDMA scheme)) from the BS, and carries out communication control between the RS and the MS based on the scheduling information. In this configuration, it is possible to simplify configuration of the RS since scheduling processing is carried out by BS in the centralized manner.

Patent Document 1: Japanese Laid-Open Patent Publication No. 2006-74325

Non-Patent Reference 1: IEEE Std 802.16™-2004

Non-Patent Reference 2: IEEE Std 802.16e™-2005

Non-Patent Reference 3: Eugene Visotsky, et al., "Proposal for Centralized HARQ Retransmission Scheduling", IEEE C80216j-07_226, 2007 Mar. 5

However, in a situation in which an RS retransmits HARQ data to an MS on a DL, or in a situation in which the MS retransmits HARQ data to the RS on a UL, a transmission result regarding HARQ data between the RS and the MS is transmitted to a BS, and retransmission of HARQ data is invoked by generating scheduling information and transmitting it to the RS after the BS is notified with the results. As a result, there is a substantial lag between the time when the occurrence of the reception failure of the HARQ data and the time when the HARQ data is retransmitted. Thus, a significant delay is introduced into data transmission between the BS and the MS. Of course, such a delay is increased as the number of RSs relaying communications between the BS and the MS.

Note that the above-described Non-Patent Reference 3 describes pre-allocating a retransmission bandwidth such that an immediate retransmission is possible in a situation in which a BS is requested retransmission from an RS and an MS. However, no specific processing by the BS and the RS is not disclosed.

SUMMARY (1) According to an aspect of the embodiment, a method includes a method of retransmission control in a wireless relay system that relays data from a wireless base station to a wireless terminal via one or a plurality of wireless relay stations, the method including: on the wireless base station or a wireless relay station that is closer to the wireless terminal than the wireless base station, transmitting new data and first allocation information on a wireless resource for transmitting the new data on a wireless link from a lower-level wireless relay station that is located downstream of the wireless base station or the wireless relay station that is closer to the wireless terminal than the wireless base station to the wireless terminal; on a marked relay station that is a wireless relay station that receives the first allocation information and the new data, checking, upon generating second allocation information for transmitting the received data to the lower-level wireless relay station or the wireless terminal based on the first allocation information, a reception result from the lower-level wireless relay station or the wireless terminal for previous transmission data; generating the second allocation information for retransmitting the previous transmission data based on the first allocation information when the reception result is a reception failure; and transmitting the second allocation information and the previous transmission data to the lower-level wireless relay station or the wireless terminal, and buffering the new data.

(2) According to an aspect of the embodiment, a method includes a method of retransmission control in a wireless relay system that transmits data from a wireless terminal to a wireless base station via one or a plurality of wireless relay stations, the method including: on the wireless base station or a wireless relay station that is closer to the wireless terminal than the wireless base station, transmitting first allocation information on a wireless resource for making a lower-level wireless relay station that is located downstream of the wireless base station or the wireless relay station that is closer to the wireless terminal than the wireless base station transmit data from the wireless terminal, on a wireless link from the lower-level wireless relay station to the wireless terminal, to the lower-level wireless relay station; on a marked relay station that is a wireless relay station that receives the first allocation information, checking, upon generating the second allocation information for transmitting a lower-level wireless relay station that is located downstream of the marked relay station or the wireless terminal based on the first allocation information, a reception result for data previously received from the lower-level wireless relay station or the wireless terminal; and generating, when the reception result is a reception failure, the second allocation information for making the lower-level wireless relay station or the wireless terminal retransmit the previously received data, and transmitting that second allocation information to the lower-level wireless relay station or the wireless terminal.

(3) According to an aspect of the embodiment, an apparatus includes a wireless relay station in a wireless relay system that relays data from a wireless base station to a wireless terminal via one or a plurality of wireless relay stations, the wireless relay station including: reception unit that receives new data and first allocation information on a wireless resource for transmitting the new data on a wireless link from the local wireless relay station to the wireless terminal, from the wireless base station or an upper-level wireless relay station that is closer to the wireless base station than the local wireless relay station; a buffer that buffers the new data and previous transmission data; allocation information generation unit that generates second allocation information for transmitting received data, to the wireless terminal or a lower-level wireless relay station that is closer to the wireless terminal than the local wireless relay station, based on the first allocation information; control unit that controls the allocation information generation unit to generate the second allocation information for retransmitting the previous transmission data based on the first allocation information when a reception result from the lower-level wireless relay station or the wireless terminal for previous transmission data is a reception failure and to make the buffer buffer the new data; and transmission unit that transmits the second allocation information and the previous transmission data to the lower-level wireless relay station or the wireless terminal.

(4) According to an aspect of the embodiment, an apparatus includes a wireless base station in a wireless relay system that relays data from a wireless base station to a wireless terminal via one or a plurality of wireless relay stations, the wireless base station including: allocation information generation unit that generates first allocation information on a wireless resource for transmitting new data from a lower-level wireless relay station that is located downstream of the local wireless base station to the wireless terminal; and transmission unit that transmits the first allocation information and the new data to the lower-level wireless relay station or the wireless terminal without waiting for reception of a reception result from the lower-level wireless base station or the wireless terminal for previous transmission data.

(5) According to an aspect of the embodiment, an apparatus includes a wireless relay station in a wireless relay system that transmits data from a wireless terminal to a wireless base station via one or a plurality of wireless relay stations, the wireless relay station including: reception unit that receives first allocation information on a wireless resource for causing data to be transmitted from the wireless terminal, on a wireless link from the local wireless relay station to the wireless terminal, from an upper-level wireless relay station that is closer to the wireless base station than the local wireless relay station or the wireless base station; allocation information generation unit that generates second allocation information for transmission to the wireless terminal or a lower-level wireless relay station that is closer to the wireless terminal than the local relay station, based on the first allocation information; control unit that controls the allocation information generation unit to generate the second allocation information for causing previously received data to be retransmit when a reception result for the previously received data from the lower-level wireless relay station or the wireless terminal is a reception failure; and transmission unit that transmits the second allocation information to the lower-level wireless relay station or the wireless terminal.

(6) According to an aspect of the embodiment, an apparatus includes a wireless relay station that transmits, to a wireless terminal, received data from a wireless base station directed to the wireless terminal, the wireless relay station including: a reception unit that receives, from the wireless base station side, first data directed to the wireless terminal and first allocation information on a wireless resource for transmitting data to the wireless terminal; and a transmission unit that transmits allocation information on a wireless resource generated according to the first allocation information and the first data to the wireless terminal using a wireless resource allocated according to the first allocation information, wherein the transmission unit, when the reception unit receives, from the wireless base station side, second data directed to the wireless terminal and second allocation information on a wireless resource for transmitting data to the wireless terminal and when it is detected that the transmission of the first data has failed, retransmits the first data by transmitting, to the wireless terminal, allocation information on a wireless resource generated according to the second allocation information and the first data using a wireless resource allocated according to the second allocation information.

(7) According to an aspect of the embodiment, an apparatus includes a wireless base station in a wireless relay system that transmits data from a wireless terminal to the wireless base station via one or a plurality of wireless relay stations, the wireless base station including: allocation information generation unit that generates first allocation information on a wireless resource for making data from the wireless base station to be transmitted on a wireless link from the local wireless base station to the wireless terminal; and transmission unit that transmits the first allocation information to a lower-level wireless relay station located downstream of the local wireless base station or the wireless terminal, irrespective of whether received data is correct or not from the lower-level wireless relay station or the wireless terminal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 4 is a diagram depicting one example of a status management table for downlink (DL) processing in the BS depicted in FIG. 2;

FIG. 5 is a diagram depicting one example of a status management table for downlink (DL) processing in the RS depicted in FIG. 3;

FIG. 8 is a diagram depicting one example of a status management table for uplink (UL) processing in the BS depicted in FIG. 2;

FIG. 9 is a diagram depicting one example of a status management table for UL processing in the RS depicted in FIG. 3;

FIG. 11 is a sequence diagram illustrating UL retransmission processing in the wireless relay system depicted in FIG. 1 (in the case of a two-hop system);

FIG. 12 is a sequence diagram illustrating UL retransmission processing in the wireless relay system depicted in FIG. 1 (in the case of a two-hop system);

FIG. 13 is a diagram depicting one example of a status management table for DL processing in the BS depicted in FIG. 2 (in the case of a three-hop system);

FIG. 14 is a diagram depicting one example of a status management table for DL processing in the RS depicted in FIG. 3 (in the case of a three-hop system);

FIG. 16 is a diagram depicting one example of a status management table for UL processing in the BS depicted in FIG. 2 (in the case of a three-hop system);

FIG. 17 is a diagram depicting one example of a status management table for UL processing in the RS depicted in FIG. 3 (in the case of a three-hop system);

FIG. 21 is a sequence diagram illustrating DL retransmission processing in the system depicted in FIG. 20; and FIG. 22 is a sequence diagram illustrating UL retransmission processing in the system depicted in FIG. 20.

DESCRIPTION OF EMBODIMENTS

As disclosed in the above-described Patent Reference 1, when the BS handles all of the scheduling for communications with the RSs or communications between the RS and the MS, the RS must successively report information to the BS, such as the communication status or the wireless status with other RS and between the RS and an MS. The BS then carries out scheduling between the RSs and between the RS and an MS based on the information transmitted from the RS and generates scheduling information for these links.

In the field of wireless communication, a technique known as the hybrid automatic repeat request (HARQ) has been proposed in order to improve the reliability of data transmissions. The HARQ is a technique that achieves error correction as well as retransmission of data when there is an error in data transmitted previously. Upon receiving HARQ data, the reception station carries out error correction using redundant bits for error correction. When an error cannot be corrected, the HARQ data is stored into a memory and retransmission from a transmitting station is requested. Error correction is carried out once again by maximum ratio combining the data being retransmitted and the data stored in the memory at the signal level, thereby increasing the efficiency of error correction. This technique can efficiently improve the reliability of data transmissions.

Figure 20:
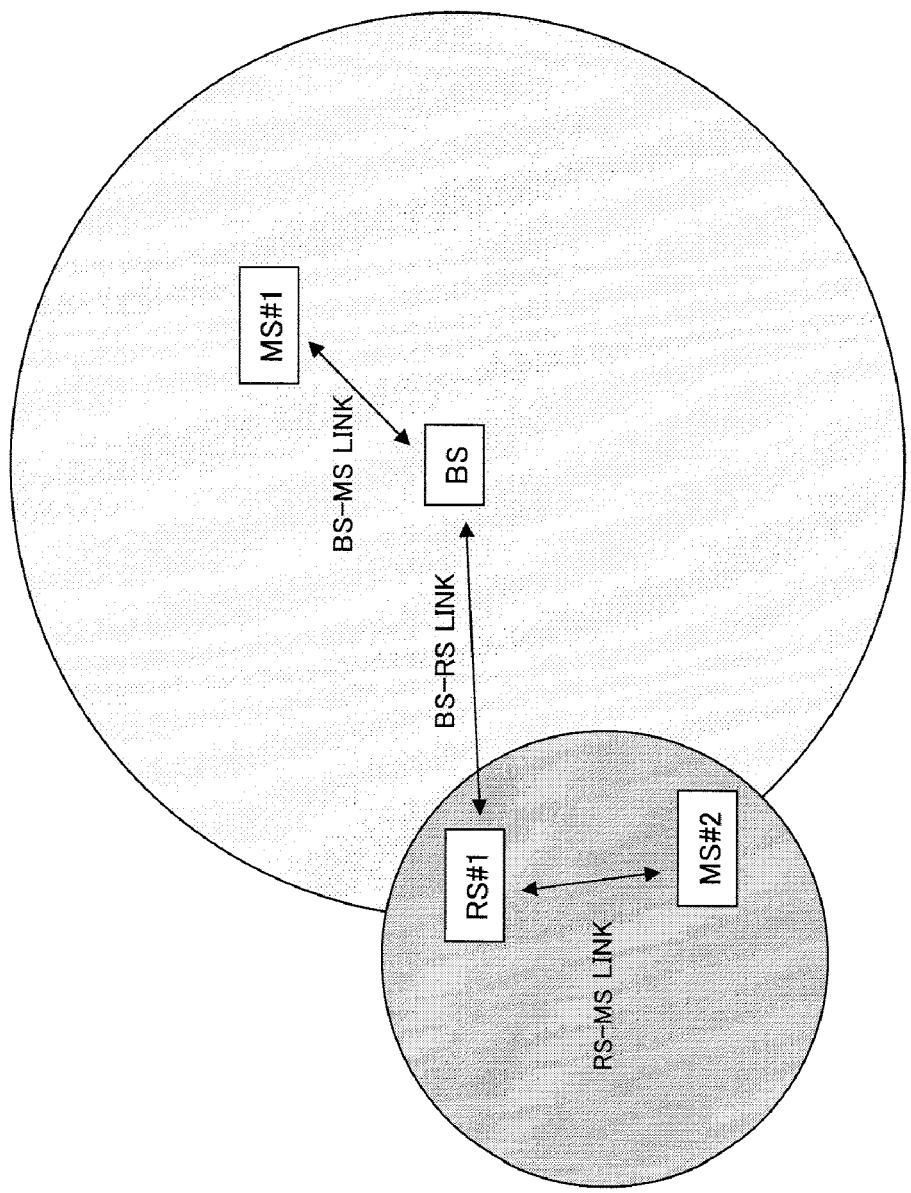
FIG. 20 is a diagram illustrating an example of a configuration in which a wireless relay station (RS) is introduced in the system depicted in FIG. 19.

Supposing that the HARQ is applied in a system having an RS as depicted in FIG. 20. If an error occurs in HARQ data while the HARQ data is being relayed and correction is impossible, the wireless resource can be used more efficiently when HARQ data is retransmitted from the RS, that has correct HARQ data.

However, in a system in which a BS manages scheduling information on every link within the communication area via the RS, in order for the RS to retransmit the HARQ data, information on a link on which an error occurs in HARQ data is notified to the BS, and the BS generates scheduling information for a retransmission of the HARQ data after receiving the notification.

For example, assume an example in which HARQ data is retransmitted from an RS to an MS in which an error occurs in the HARQ data between the RS and the MS during downlink (DL) data transmission in a two-hop system depicted in FIG. 21. Note that direction from the BS to the MS via the RS is downlink, and the opposite direction is uplink (UL).

The BS transmits scheduling (SCH) information on a wireless link between the RS and the MS (RS-MS DL) and a DL/UL MAP to the RS (steps A101 and A102), and transmits HARQ data #1 to the RS (Step A103).

Here, the above-described scheduling information includes information on relay of the transmission data (HARQ data), i.e., allocation information on the region (wireless resource called "burst") that is to be used by the RS and the MS for communication on the wireless link (wireless frame) between the RS and the MS, more specifically, allocation information on a DL burst that is to be used by the RS for transmitting the HARQ data to the MS, and a UL burst that is to be used by the MS that receives the HARQ data #1 for transmitting (responding with) a reception result (an ACK indicating a reception success, or a NAK indicating a reception failure) to the RS.

In addition, the above-described DL/UL MAP includes information on which region (DL burst) is to be used for transmitting scheduling information and HARQ data to the RS on a wireless link between the BS and the RS (BS-RS DL), and information on which region (UL ACK channel region) is to be used for transmitting (responding with) a reception result (an ACK indicating a reception success, or a NAK indicating a reception failure) regarding to the HARQ data from the RS to the BS. Note that an ACK or a NAK from the MS and the RS is transmitted on a specialized region known as a UL ACK channel region.

Thus, the RS is enabled to receive the scheduling information and the HARQ data from the BS by carrying out reception processing on a DL burst indicated by the DL/UL MAP received from the BS, to transmit a reception result regarding the HARQ data received from the MS to the BS on the UL ACK channel region indicated by the DL/UL MAP, and to control communication (burst allocation) with the MS based on the received scheduling information.

The RS then generates a RS-MS DL/UL MAP (information indicating on which DL burst is to be used for transmitting the HARQ data #1 to the MS, information indicating which ULACK channel region is to be used for transmitting a reception result regarding the HARQ data #1) based on the scheduling information received from the BS, transmits the generated information to the MS, and transmits the HARQ data #1 received from the BS to the MS on the DL burst indicated by the DL/UL MAP (Steps A104 and A105). In addition, the RS transmits information indicating that the HARQ data #1 from the BS has been successfully received (decoded) (reception success) (ACK) to BS on the above-described UL ACK channel region indicated by the DL/UL MAP received from the BS (Step A107).

The MS then receives the HARQ data #1 by carrying out reception processing on the above-described DL burst indicated by the DL/UL MAP from the RS. If the HARQ data #1 cannot be received (decoded) successfully because an error occurs (Step A106), the MS transmits information indicating the error (reception failure) (NAK) to the RS on the above-described the UL ACK channel region indicated by the DL/UL MAP received from the RS (Step A108).

The NAK is relayed to the BS via the RS (Step A109), and the BS that receives the NAK generates a DL/UL MAP and scheduling information for causing the RS to retransmit the HARQ data #1 and transmits it to the RS (Steps A110 and A111).

Once the RS receives the DL/UL MAP for retransmitting the above-described HARQ data #1 from the BS and receives the DL/UL MAP indicated by the DL burst (scheduling information), the RS generates an RS-MS DL/UL MAP based on the scheduling information and transmit it to the MS, as well as retransmitting the HARQ data #1 (Steps A112 and A113).

In contrast, assume an example in which HARQ data is retransmitted from an MS to an RS in which an error occurs in HARQ data between an MS and an RS during UL data transmission in a two-hop system depicted in FIG. 22.

The BS transmits scheduling (SCH) information on a wireless link between the RS and the MS, as information for relaying transmission data (HARQ data) #1 from MS by the RS, to the RS (Steps B121 and B122).

Here, the scheduling information includes information regarding relay of transmission data (HARQ data) from the MS, i.e., allocation information on which burst is to be used for communication by the RS and the MS on the wireless link (wireless frame) between the RS and the MS, more specifically, allocation information on a UL burst to be used by MS for transmitting the HARQ data to RS. In addition, the DL/UL MAP includes information indicating on which region (DL burst) is to be used for transmitting the scheduling information on the wireless link between the BS and the RS.

Thus, the RS is enabled to receive the above-described scheduling information by carrying out reception processing on the DL burst indicated by the DL/UL MAP, and to control communication (burst allocation) with the MS based on the scheduling information.

That is, the RS generates a RS-MS DL/UL MAP (information indicating on which UL burst is to be used by the MS for transmitting the HARQ data #1) based on the scheduling information received from the BS, and transmits it to MS in this manner (Step B123).

Once the MS receives the DL/UL MAP from the RS, the MS transmits the HARQ data #1 to the BS on the UL burst indicated by the DL/UL MAP (Step B125).

If the RS receives the HARQ data #1 from the MS successfully, the RS notifies the BS with a reception success (ACK) of the HARQ data #1. Otherwise, if the HARQ data #1 cannot be success fully received because an error occurs (Step B126), the RS notifies BS with a reception failure (NAK) of the HARQ data #1 from the MS (Step B128).

Note that, during this time, the BS allocates a region (UL burst) for relaying (transmitting) the HARQ data #1 received by RS from the MS to the BS, using the DL/UL MAP (Steps B124 and B127). However, since the RS has not succeeded in receiving the HARQ data #1 from the MS, the RS does not receive the HARQ data #1 on this region.

Once the BS receive the above-described NAK from the RS, the BS generates scheduling information for retransmission of the HARQ data #1 from the MS, and generates information indicating on which DL burst for the BS-RS DL is to be used for transmitting the scheduling information (DL/UL MAP) and transmits it to the RS (Steps B129 and B130).

Once the RS obtains the scheduling information by carrying out reception processing on the DL burst indicated by the DL/UL MAP received from the BS, the RS generates an RS-MS UL DL/UL MAP based on the scheduling information and requests retransmission of the HARQ data #1 to the MS by transmitting the DL/UL MAP to the MS (Step B131). Once the MS receives the retransmission request (DL/UL MAP), the MS retransmit the HARQ data #1 on the UL burst indicated by the DL/UL MAP (Step B132).

However, in a situation in which an RS retransmits HARQ data to an MS on a DL, or in a situation in which the MS retransmits HARQ data to the RS on a UL, a transmission result regarding HARQ data between the RS and the MS is transmitted to a BS, and retransmission of HARQ data is invoked by generating scheduling information and transmitting it to the RS after the BS is notified with the results. As a result, there is a substantial lag between the time when the occurrence of the reception failure of the HARQ data and the time when the HARQ data is retransmitted. Thus, a significant delay is introduced into data transmission between the BS and the MS. Of course, such a delay is increased as the number of RSs relaying communications between the BS and the MS.

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

(A) First Embodiment

Figure 1:
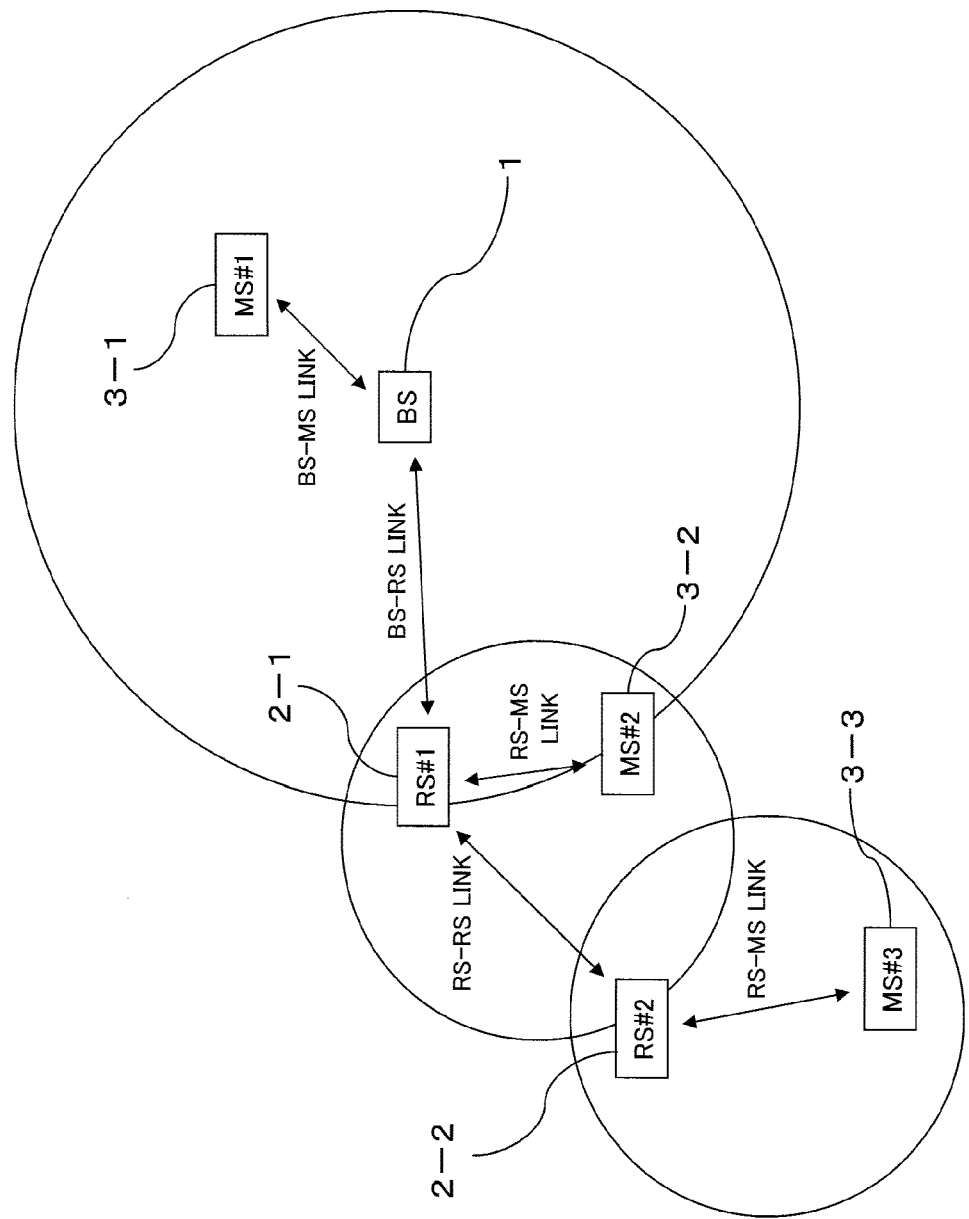
FIG. 1 is a block diagram illustrating a configuration of wireless relay system according to a first embodiment.

FIG. 1 is a block diagram illustrating a configuration of a wireless relay system according to a first embodiment. The system depicted in FIG. 1 is configured to include a wireless base station (BS) 1, multiple (two in this example) wireless relay stations (RSs) 2 (2-1 (#1) and 2-2 (#2)), and multiple (three in this example) wireless terminals (MSs) 3 (3-1 (#1), 3-2 (#2), and 3-3 (#3)). The MSs 3 may communicate with the BS 1 directly or via one or more of RSs 2. That is, as depicted in FIG. 1, the MS 3-1 can directly communicate with the BS 1, the MS 3-2 that is located in the vicinity of the border of the service area (wireless area) of the BS 1 can communicate with the BS 1 via the RS 2-1, and the MS 3-3 that is located outside the service area of the BS 1 can communicate with the BS 1 via the RSs 2-1 and 2-2 (multi-hop connection).

In addition, this wireless relay system relies on communications between the BS 1 and an MS 3, between the BS 1 and an RS 2, between the RSs 2, and between an RS 2 and an MS 3 using wireless frames compliant to the WiMAX standard, i.e., OFDM or OFDMA frames. The BS 1 is adapted to manage and control communications on all of the wireless links (the BS-MS link, the BS-RS link, the RS-RS link, and the RS-MS links) in a centralized manner.

That is, the BS 1 is adapted to control communications on a target wireless link by managing (generating) scheduling information in a centralized manner for allocating wireless resources (communication regions of the above-described wireless frames, also known as bursts) to each of the above-described wireless links, and transmitting necessary scheduling information to an RS 2 concerned.

(Configuration of BS)

Figure 2:
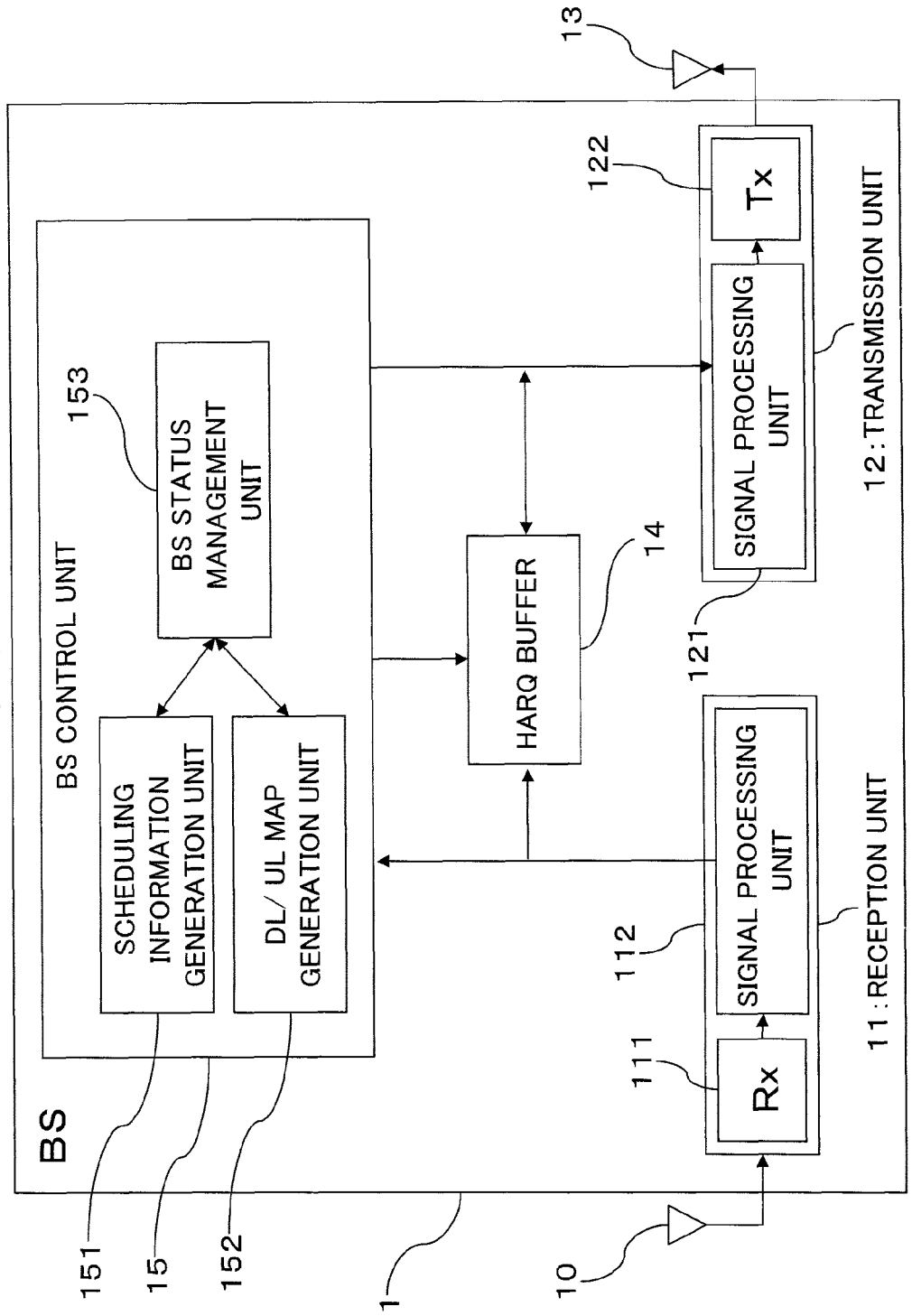
FIG. 2 is a functional block diagram illustrating a configuration focusing on the main portion of the wireless base station (BS) depicted in FIG. 1.

FIG. 2 is a function block diagram illustrating the configuration focusing on the main portion of the BS 1 described above. The BS 1 depicted in FIG. 2 is configured to include a reception antenna 10, a reception unit 11, a transmission unit 12, a transmission antenna 13, an HARQ buffer 14, and a BS control unit 15, for example.

The reception antenna 10 is adapted to receive RF signals (e.g., messages or data) from the RSs 2 or the MSs 3. The reception unit 11 is adapted to carry out required reception processing on an RF signal received by the reception antenna 10. For this purpose, the reception unit 11 is configured to include a wireless (RF) receiver (Rx) 111 and a signal processing unit 112, for example. The RF receiver 111 is adapted to carry out required wireless reception processing on the RF signal received by the reception antenna 10, such as a frequency conversion to the baseband frequency (down conversion), or an analog-to-digital (AD) conversion to digital signals for digital signal processing. The signal processing unit 112 is adapted to carry out required digital signal processing including at least demodulation processing and decoding processing on the baseband digital signals obtained through the RF receiver 111.

In addition, the transmission unit 12 is adapted to generate downlink (DL) transmission signals directed to the MSs 3, for example, and is configured to include a signal processing unit 121 and a wireless (RF) transmitter (Tx) 122. The signal processing unit 121 is adapted to carry out required digital signal processing, including code processing (error correction coding, such as convolutional codes or turbo codes) of signals (e.g., messages or data) to be transmitted to the MSs 3, generation processing of transmission frames in a predetermined format (OFDM frames or OFDMA frames), modulation processing, such as QPSK, 16 QAM, or the like. The RF transmitter 122 is adapted to carry out required wireless transmission processing on the transmission signals (digital baseband signals) obtained by the signal processing unit 121, such as digital-to-analog conversion (DA) to analog signals or frequency conversion (up conversion) to transmission RF signals, or the like.

The transmission antenna 13 is adapted to emit the transmission signals obtained at the transmission unit 12 to the RSs 2 or the MSs 3.

The HARQ buffer 14 is adapted to temporarily buffer data sequentially that is transmitted to the MSs 3 for possible future retransmission. The BS control unit 15 is adapted to include a function to control communications on each wireless link between the BS 1 and an MS 3, between the BS 1 and an RS 2, between the RSs 2, and between an RS 2 and an MS 3, as described above, and is configured to include a scheduling (SCH) information generation unit 151, a DL/UL MAP generation unit 152, and the BS status management unit 153, for example.

Here, the scheduling information generation unit 151 can generate scheduling information on each wireless link from the BS 1 to an MS 3. The DL/UL MAP generation unit 152 can generate a DL/UL MAP including burst allocation information on wireless links with the RS 2 or the MS 3 which is next-hop destination node.

The BS status management unit 153 is adapted to manage four statuses S0, S1, S2, and S3 using a status management table as depicted in FIG. 4 for the DL, and manage three statuses S0, S1, and S2 using a status management table as depicted in FIG. 8 for the UL. The BS control unit 15 is adapted to carry out processing for the DL and the UL according to these statuses. The description now will be described later in detail.

(Configuration of RS)

Figure 3:
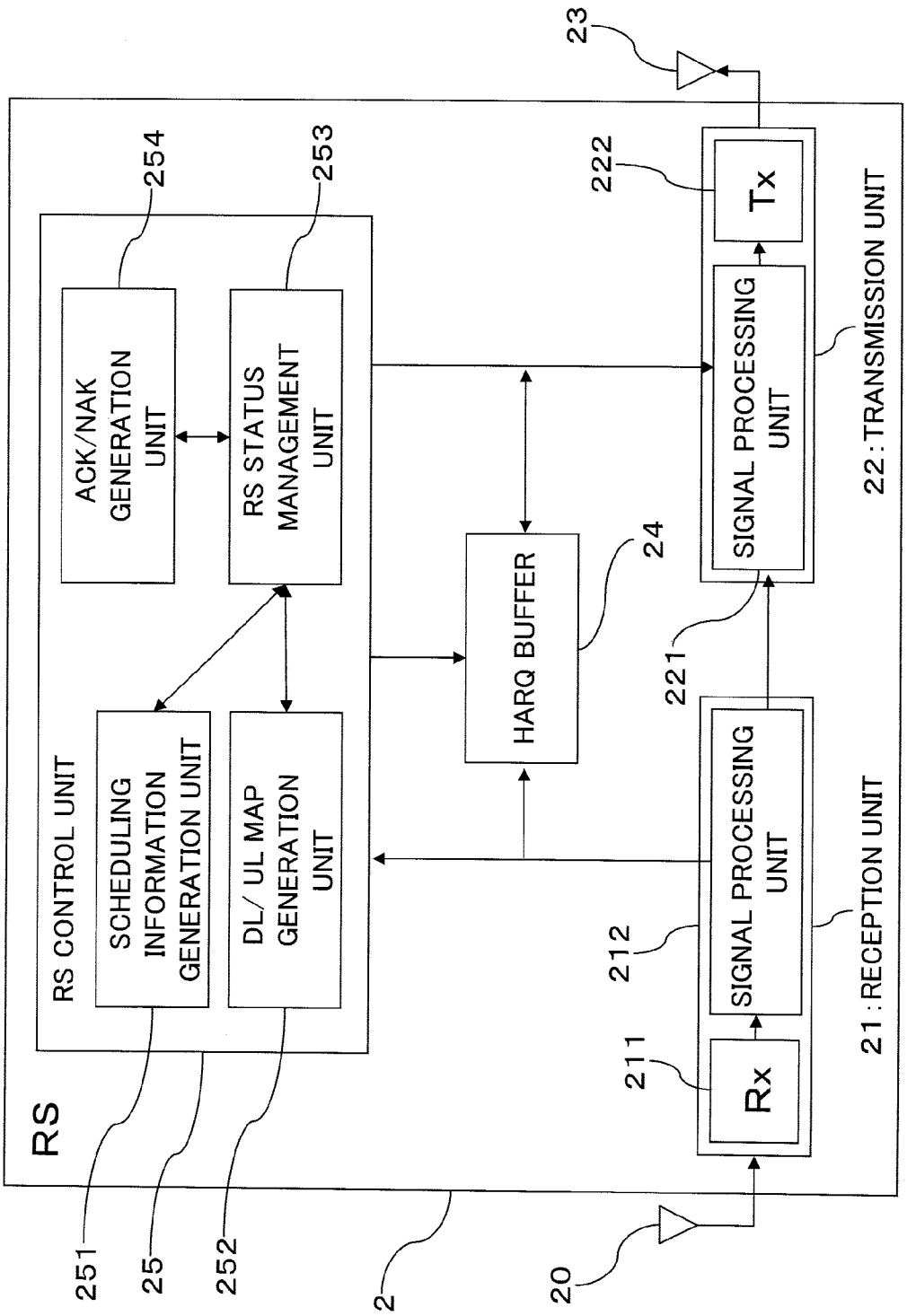
FIG. 3 is a functional block diagram illustrating a configuration focusing on the main portion of the wireless relay station (RS) depicted in FIG. 1.

On the other hand, the above-described the RS 2 is configured to include, when focusing on the function of the main portion thereof, for example, a reception antenna 20, a reception unit 21, a transmission unit 22, a transmission antenna 23, an HARQ buffer 24, and an RS control unit 25, as depicted in FIG. 3.

The reception antenna 20 is adapted to receive RF signals from the BS 1 or the MSs 3, or the other RS 2. The reception unit 21 is adapted to carry out required reception processing on an RF signal received by the reception antenna 20. For this purpose, the reception unit 21 is configured to include a wireless (RF) receiver (Rx) 211 and a signal processing unit 212, for example. The RF receiver 211 is adapted to carry out required wireless reception processing on the RF signal received by the reception antenna 20, such as a frequency conversion to the baseband frequency (down conversion), or an analog-to-digital (AD) conversion to digital signals for digital signal processing.

The signal processing unit 212 is adapted to carry out required digital signal processing including at least demodulation processing and decoding processing on the baseband digital signals obtained through the RF receiver 211. The signal that is subjected to such signal processing is adapted to be input to the transmission unit 22 (signal processing unit 221) for relay to the MSs 3.

In addition, the transmission unit 22 is adapted to generate transmission signals directed to the MSs 3 or the BS 1, or the other RS, for example, and is configured to include a signal processing unit 221 and a wireless (RF) transmitter (Tx) 222. The signal processing unit 221 is adapted to carry out required digital signal processing, including code processing (error correction coding, such as convolutional codes or turbo codes) of signals (e.g., messages or data) to be transmitted to the MSs 3 or the BS 1, generation processing of transmission frames in a predetermined format (OFDM frames or OFDMA frames), modulation processing, such as QPSK, 16 QAM, or the like. The RF transmitter 222 is adapted to carry out required wireless transmission processing on the transmission signals (digital baseband signals) obtained by the signal processing unit 221, such as digital-to-analog conversion (DA) to analog signals or frequency conversion (up conversion) to transmission RF signals, or the like.

The transmission antenna 23 is adapted to emit the transmission signals obtained at the transmission unit 22 to the MSs 3 or BS 1, or the other RS 2.

The HARQ buffer 24 is adapted to temporarily buffer data sequentially that is transmitted to the MSs 3 or BS 1, or the other RS 2 for possible future retransmission. Note that the HARQ buffer 24 is adapted to store new data received from the BS 1 or the MSs 3, or the other RS 2 (data that has not transmitted to the next hop destination node) under the control of the RS control unit 25, as descried below.

The RS control unit 25 is adapted to include a function to control communications on the wireless links between the local RS 2 and the MSs 3 or the lower-level RS 2 based on the scheduling information received directly from the BS 1 or via the upper-level RS 2 (burst allocation, data reception and reception processing), and is configured to include a scheduling (SCH) information generation unit 251, a DL/UL MAP generation unit 252, an RS status management unit 253, and a reception result (response: ACK/NAK) generation unit 254, for example.

Here, the scheduling information generation unit 251 is adapted to generate scheduling information to be transmitted to the lower-level RS 2 that is the next hop destination node based on the scheduling information received directly from the BS 1 or via the upper-level RS 2 when the next hop destination node of data directed to the MSs 3 is the other RS 2. Note that the "upper-level RS 2" refers to the RS 2 that is closer to the BS 1, and the "lower-level (subordinate) RS 2" refers to the RS 2 that is closer to the MS 3.

In addition, the DL/UL MAP generation unit 252 may generate a DL/UL MAP including burst allocation information on a wireless link with the MS 3 or the other RS 2 that is the next hop destination node based on the scheduling information received directly from the BS 1 or via the upper-level RS 2. The reception result (response) generation unit 254 may generate reception result information (ACK or NAK) that is to be transmitted (responded) to the BS.

The RS status management unit 253 is adapted to manage five statuses S0, S1, S2, S3, and S4 using a status management table as depicted in FIG. 5 for the DL, and manage two statuses S0 and S1 using a status management table as depicted in FIG. 9 for the UL. The RS control unit 25 is adapted to carry out processing for the DL and the UL according to these statuses. The description thereof will be described later in detail.

(Fundamental Operations of BS 1 and RS 2)

Fundamental operations (DL processing and UL processing) of the BS 1 and the RS 2 in this example which are configured as descried above will be described.

(DL Processing)

(1) As for DL, when the RS 2 receives scheduling information (first allocation information) on the link between the local RS 2 and the lower-level RS 2, or the link between the local RS 2 and the MS 3, and new HARQ data, from the BS 1 or the upper-level RS 2, the RS 2 generates a DL/UL MAP (second allocation information) for transmitting (relaying) the received new HARQ data to the lower-level RS 2 or the MS 3 that is the next hop destination node if previous (immediate previous) HARQ data has been transmitted to the lower-level RS 2 or the MS 3 and transmits the DL/UL MAP to the next hop destination node, as well as transmitting the HARQ data to the next hop destination node.

(2) On the other hand, when the transmission of the previous HARQ data has failed, the received new HARQ data is buffered in the HARQ buffer 24 in the local RS 2, and the retransmission of the previous HARQ data is carried out. For this, based on the scheduling information (first allocation information) for transmitting received new HARQ data from the BS 1 or the upper-level RS 2, a DL/UL MAP (second allocation information) for retransmission of the previous HARQ data is generated and transmitted.

(3) In addition, as for transmission of the buffer HARQ data from the RS 2, a DL/UL MAP for transmitting the HARQ data from scheduling information (the scheduling information includes information on transmission of the HARQ data) transmitted from the BS 1 or the upper-level RS 2 is generated and transmitted, and the buffered HARQ data is transmitted.

(4) Furthermore, if there is an error in the HARQ data when the HARQ data and scheduling information regarding transmission (relay) of the HARQ data are received from the BS 1 or the upper-level RS 2, the HARQ data that was previously transmitted is retransmitted to the lower-level RS 2 or the MS 3 that is the next hop destination node. That is, irrespective of whether a response from the next hop destination node for the previous HARQ data is an ACK (reception success) or a NAK (reception failure), the DL/UL MAP is generated and transmitted such that the previous HARQ data is transmitted. Alternatively, under this circumstance, when the response from the subordinate RS 2 or the MS 3 for the immediate previous HARQ data is an ACK (reception success), the HARQ data may not be transmitted (5) When the RS 2 receives scheduling information from the BS 1 or the upper-level RS 2, the RS 2 modifies (updates) flag information (the value of AI_SN depicted in FIG. 6) which indicates whether the transmission is a new transmission or a retransmission upon generating the DL/UL MAP based on information related to transmission (relay) of HARQ data included in the scheduling information. That is, the RS 2 updates the flag information for transmission of HARQ data in the DL/UL MAP in accordance with whether the transmission of the HARQ data is for new transmission or retransmission.

(6) On the other hand, as for the DL, the BS 1 carries out transmission of the new HARQ data and transmission of scheduling information for relaying the HARQ data without waiting for receiving a reception result of the HARQ data from the lower-level RS 2 or the MS 3 (ACK or NAK).

(7) In addition, the BS 1 receives the reception result from the lower-level RS 2 or the MS 3, and if transmission of the HARQ data has failed on any of the units, the BS 1 generates scheduling information for retransmitting the HARQ data on that unit and transmits it to the RS 2. At this time, transmission of new HARQ data may be carried out or may be stopped.

(UL Processing)

(8) On the other hand, as for the UL, the RS 2 generates a DL/UL MAP for the lower-level RS 2 or the MS 3 based on the scheduling information for transmitting (relaying) the HARQ data from the lower-level RS 2 or the MS 3, which is received from the BS 1 or the upper-level RS 2. At this time, the RS 2 determines whether the RS 2 makes the lower-level RS 2 or the MS 3 carry out retransmission or transmission of new HARQ data in accordance with the reception status of the previously (immediate previous) received HARQ data. That is, new HARQ data is made transmitted if reception of the immediate previous HARQ data has succeeded. On the other hand, if reception of the immediate previous HARQ data has failed, the HARQ data is made retransmitted.

(9) Once the RS 2 receives HARQ data from the lower-level RS 2 or the MS 3, the RS 2 transmits the received result to the upper-level RS 2 or the BS 1. This is to direct the upper-level RS 2 or the BS 1 not to receive the HARQ data if reception has failed at the RS 2 since the BS 1 or the upper-level RS 2 carries out allocation for transmission of subsequent new HARQ without checking the reception result at the lower-level RS 2.

(10) Furthermore, if the RS 2 successfully receives HARQ data from the lower-level RS 2 or the MS 3 but retransmission of the immediate previous HARQ data is request by the upper-level RS 2 or the BS 1, the RS 2 buffers the received HARQ data in the HARQ buffer 24 and retransmits the immediate previous HARQ data to the upper-level RS 2 or the BS 1.

(11) In addition, retransmission of the immediate previous HARQ data is request by the upper-level RS 2 or the BS 1 while the RS 2 buffers the HARQ data from the subordinate RS 2 or the MS 3, retransmission of the buffered HARQ data is request to the subordinate RS 2 or the MS 3. By executing such processing, it is possible to suppress transmission or relay of new HARQ data from the subordinate RS 2 or the MS 3, thereby preventing buffer overflow of the HARQ buffer 24 in the RS 2.

(12) In the RS 2, transmission of new HARQ data or retransmission of the immediate previous HARQ data to the subordinate RS 2 or the MS 3 is carried out by updating flag information (the value of AI_SN depicted in FIG. 10) which indicates whether the transmission is a new transmission or a retransmission of HARQ data in a DL/UL MAP that is to be transmitted to the subordinate RS 2 or the MS 3.

(13) The generation of the DL/UL MAP is carried out based on scheduling information received directly from the BS 1 or via the upper-level RS 2.

(14) In addition, as for the UL, in order to make the lower-level RS 2 and the MS 3 continuously transmit HARQ data, the BS 1 continuously transmits scheduling information for transmitting HARQ data. Thereby, the RS 2 can continuously transmit HARQ data by controlling transmission of new HARQ data or retransmission of HARQ data based on reception results of HARQ data from the subordinate RS 2 or the MS 3 or relay requests for HARQ data from an upper-level node.

As described above, as for the DL, since the BS 1 transmits new HARQ data without waiting for a response with a reception result of HARQ data from the lower-level RS 2 or the MS 3, it is possible to carry out continuous transmission of HARQ data to the MS 3 irrespective of whether the system is multi-hop or not.

In addition, even if an error occurs in HARQ data on a DL path, the RS 2 generates (updates) a DL/UL MAP such that retransmission of the immediate previous HARQ data is carried out based on the scheduling information for relaying new HARQ data received from the BS 1, and retransmits previous HARQ data. Thereby, it is possible to immediately respond to retransmission of HARQ data requested from the subordinate RS 2 or the MS 3.

On the other hand, as for the UL, the BS 1 transmits scheduling information that directs the subordinate RS 2 and the MS 3 to transmit HARQ data whenever necessary, and the RS 2 requests retransmission of HARQ data or transmission of new HARQ data from the reception result of HARQ data from the subordinate RS 2 or the MS 3. Thereby, continuous relay of HARQ data is made possible.

(Detailed Example of DL Processing)

Next, details on DL processing in a case in which one RS 2 relays communications between the BS 1 and the MS 3 (two-hop system) will be explained with reference to FIGS. 4-7.

(Processing at BS 1)

FIG. 4 illustrates an example of processing operation at the BS 1 (BS control unit 15) opportunity to transmit HARQ data is given to the RS 2.

The BS 1 trucks and manages reception status of HARQ data (ACK and NAK) at the RS 2 and the MS 3, and determines transmission scheduling information including information regarding transmission of subsequent new HARQ data or transmission (relay) of the HARQ data based on this status.

That is, the BS 1 (BS control unit 15) in this example manages the following statuses S0, S1, S2, and S3 based on a reception result for the immediate previous HARQ data received from the RS 2 (hereinafter, referred to as a response), and a reception result for the second previous HARQ data received from the MS 3 via the RS 2, and carries out processing in accordance with the status at the BS status management unit 153 (status management table).

(Status S0) When a response for the immediate previous HARQ data from the RS 2 is an ACK (reception success) and a response for the second previous HARQ data from the MS 3 is an ACK (reception success), the BS 1 transmits new HARQ data, as well as scheduling information including information on relay of the HARQ data, to the RS 2.

(Status S1) When a response for the immediate previous HARQ data from the RS 2 is an ACK (reception success) and a response for the second previous HARQ data from the MS 3 is a NAK (retransmission request), the immediate previous HARQ data is buffered in the HARQ buffer 24 in the RS 2. Thus, the BS 1 transmits scheduling information that directs the MS 3 to transmit the buffered HARQ data from the RS 2, to the RS 2. At this time, no new HARQ data is transmitted.

(Status S2) On the other hand, when a response for the immediate previous HARQ data from the RS 2 is a NAK (retransmission request) and a response for the second previous HARQ data from the MS 3 is an ACK (reception success), the BS 1 carries out retransmission of the immediate previous HARQ data to the RS 2. At this time, scheduling information regarding relay of the HARQ data is also transmitted.

(Status S3) If a response for the immediate previous HARQ data from the RS 2 is a NAK (retransmission request) and a response for the second previous HARQ data from the MS 3 is a NACK (retransmission request), the same processing as in Status S2 is carried out.

(Processing at RS 2)

On the other hand, FIG. 5 illustrates an example of processing operation at the RS 2 (the RS control unit 25) when scheduling information is received, or scheduling information and HARQ data are received from the BS 1.

That is, at the RS 2, five statuses S0, S1, S2, S3, and S4 are managed by the RS status management unit 253 (status management table) based on a response for the immediate previous HARQ data from the MS 3, presence/absence of HARQ data in the HARQ buffer 24 in the local RS 2, and reception status of HARQ data from the BS 1, and processing is carried out in accordance with the statuses (identifying HARQ data to be transmitted to the MS 3 and updating the AI_SN to be set in a DL/UL MAP).

Figure 6:
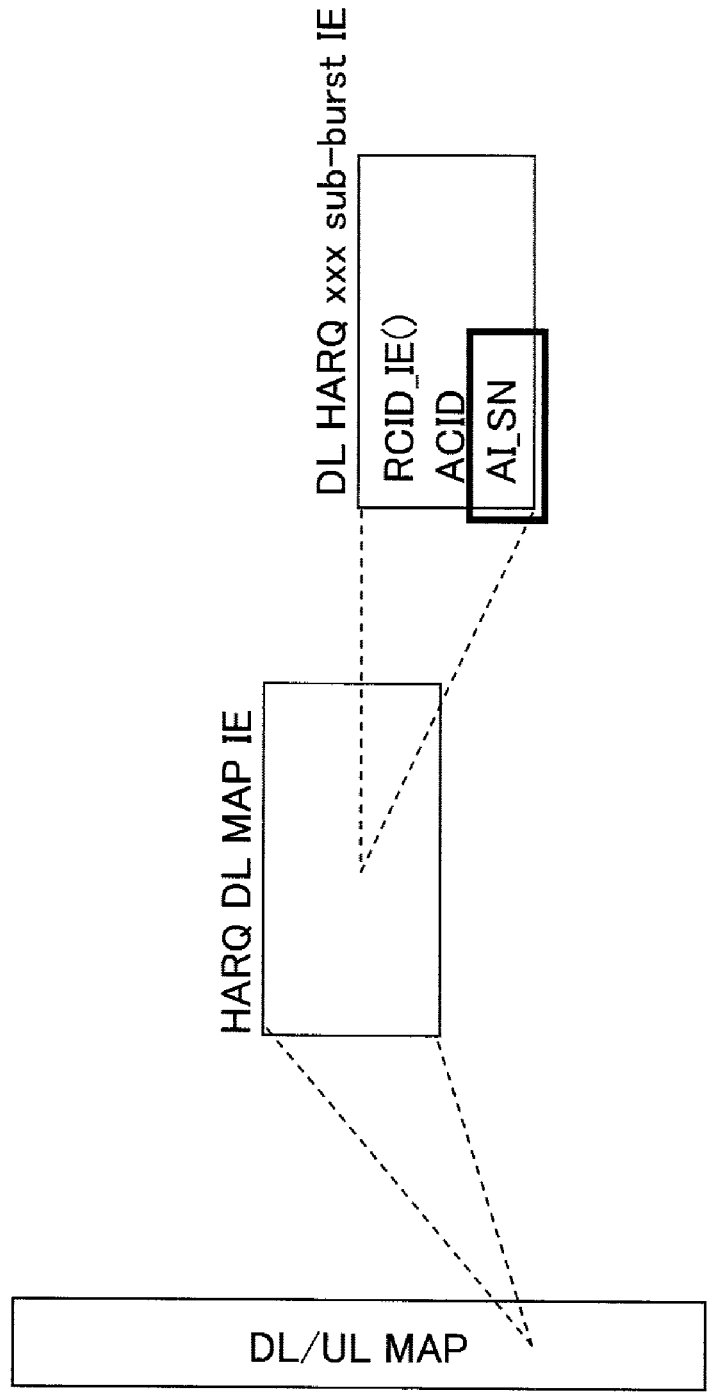
FIG. 6 is a diagram depicting the format of DL/UL MAP for illustrating an update of flag information (AI_SN) in DL processing by the RS depicted in FIG. 3.

One example of a DL/UL MAP transmitted from the RS 2 to the MS 3 is illustrated in FIG. 6.

The DL/UL MAP includes a HARQ DL MAP IE (information element) that is transmission information on HARQ data in a wireless frame. The HARQ DL MAP IE includes DL HARQ xxx sub-burst IE that includes identification information (RCID_IE) of the MS 3, information indicating the channel number of the HARQ data (ACID), information indicating whether the transmission is a new transmission or a retransmission (AI_SN), and the like. Note that "xxx" represents a pattern of the HARQ, such as, Chase, IR CTC, or the like.

When the RS 2 receives scheduling information from the BS I and generates a DL/UL MAP, the RS 2 updates information in the IE regarding HARQ data according to the reception status of the HARQ data at the MS 3. Specifically, the RS 2 updates flag information (AI_SN) indicating whether the transmission of the HARQ data is a new transmission or a retransmission. The possible values of AN_SI is "0" or "1," and AN_SI indicates retransmission if the value is the same as the value upon the transmission of previous HARQ data and indicates transmission of new HARQ data when the values are different.

For example, Status S0 in FIG. 5 indicates the status in which transmission of the HARQ data to the MS 3 is not carried out. If the RS 2 successfully receives new HARQ data from the BS 1, the RS 2 relays the HARQ data to the MS 3. At this time, the AI_SN in the DL/UL MAP to be transmitted from the RS 2 to the MS 3 is set to the value such that it coincides with the value set in the scheduling information received from the BS 1 (no AI_SN inversion).

On the other hand, if the RS 2 fails to receive HARQ data from the BS 1 in Status S0, the RS 2 does not relay HARQ data. The value of the AI_SN is set to the value different from the corresponding value in the scheduling information (with AI_SN inversion). At this time, since the MS 3 cannot receive the HARQ data successfully, the MS 3 notifies the RS 2 with a NAK (retransmission request). Thereafter, the RS 2 sets the value of the AI_SN in the DL/UL MAP transmitted from the RS 2 to the MS 3 to the value that coincides with the value in the scheduling information when relaying successfully received HARQ data from the BS 1 to the MS 3. In this case, the MS 3 discards HARQ data older than that data, and receives new HARQ data.

In addition, Status S1 is a status in which a response from the MS 3 for HARQ data that is previously transmitted is an ACK (reception success) and no HARQ data is stored in the HARQ buffer 24 in the RS 2. In this status, when HARQ data from the BS 1 is successfully received, the RS 2 relays received HARQ data to the MS 3. At this time, the AI_SN in a DL/UL MAP to be transmitted from the RS 2 to the MS 3 is set to a value different from the corresponding value in scheduling information received from the BS 1 (with AI_SN inversion).

On the other hand, if the RS 2 fails to receive the HARQ data from the BS 1, the RS 2 sets the AI_SN in a DL/UL MAP to be transmitted to the MS 3 to the same value as the AI_SN in the DL/UL MAP that was previously transmitted (no AI_SN inversion), and carries out transmission of previous HARQ data (retransmission) (alternatively, no transmission of the HARQ data is carried out). The MS 3 determines that the transmission is retransmission of previous HARQ data by looking up the DL/UL MAP. Since the HARQ data has already received, the MS 3 transmits an ACK (reception success) to the RS 2.

Furthermore, Status S2 is a status in which a response from the MS 3 for HARQ data that is previously transmitted is a NAK (retransmission request), and no HARQ data is stored in the HARQ buffer 24 in the RS 2. In this status, if the HARQ data from the BS 1 is successfully received, the RS 2 stores the HARQ data in the HARQ buffer 24, and sets the AI_SN in a DL/UL MAP to be transmitted to the MS 3 to the same value as that of the AI_SN in the DL/UL MAP that was previously transmitted (no AI_SN inversion). The RS 2 then retransmits the previous HARQ data to the MS 3. On the other hand, if the RS 2 fails to receive the HARQ data from the BS 1, the previous HARQ data is retransmitted to the MS 3 without modifying the value of the AI_SN in the DL/UL MAP. The HARQ data from the BS 1, however, is not stored in the HARQ buffer 24.

In addition, Status S3 and Status S4 are statuses in which HARQ data from the BS 1 is stored in the HARQ buffer 24 in the RS 2. In this status, the RS 2 only receives scheduling information describing retransmission of HARQ data from the BS 1.

Status S3 is the status in which a response from the MS 3 for HARQ data that is previously transmitted is an ACK (reception success), the HARQ data is buffered in the HARQ buffer 24 is transmitted to the MS 3. At this time, the AI_SN in the DL/UL MAP is inversed. On the other hand, Status S4 is the status in which a response from the MS 3 for HARQ data that is previously transmitted is a NAK (retransmission request), the previous HARQ data is retransmitted to the MS 3. The AI_SN in the DL/UL MAP in this case is set to the same value as the value of the AI_SN upon previous transmission (no AI_SN inversion).

(DL Retransmission Control Sequence in Two-hop System)

Figure 7:
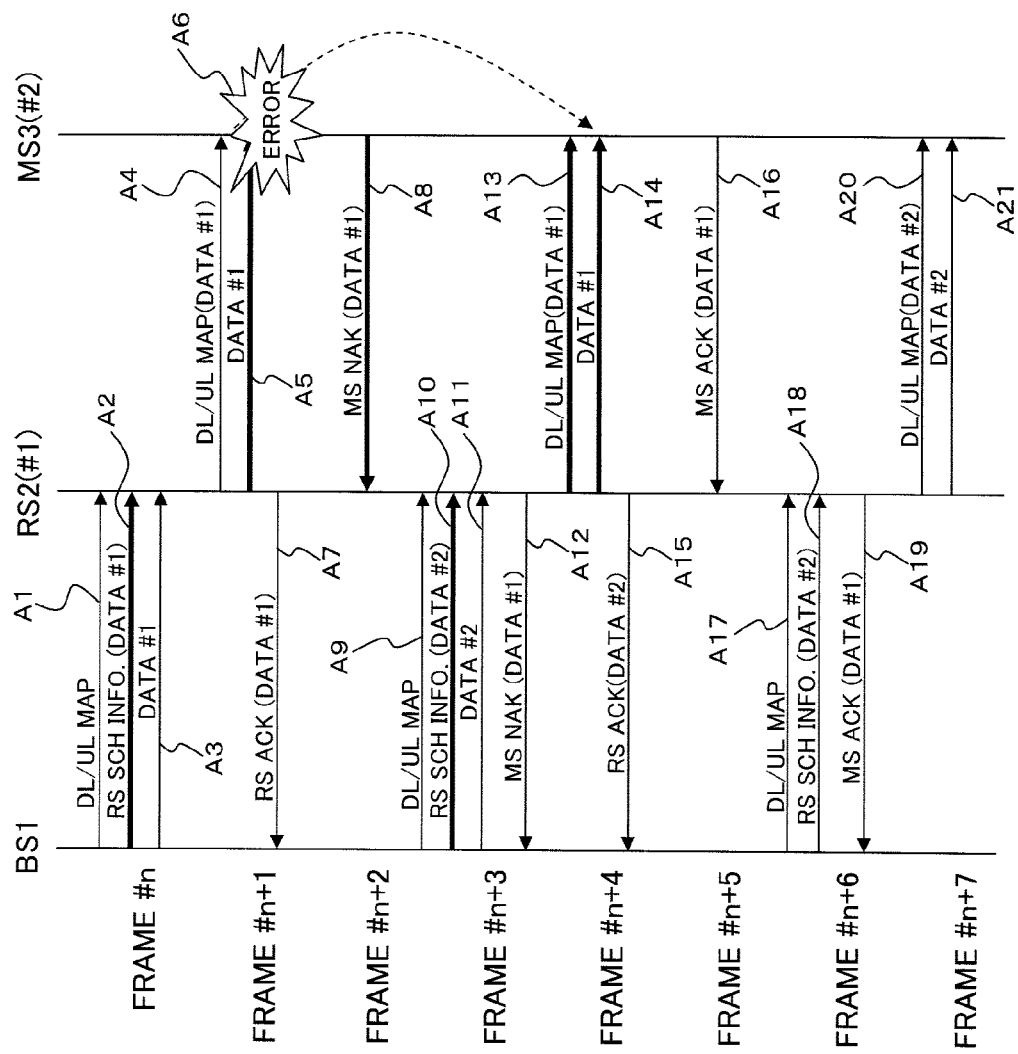
FIG. 7 is a sequence diagram illustrating DL retransmission processing in the wireless relay system depicted in FIG. 1 (in the case of a two-hop system)

Next, assuming the above-described operations (DL processing) of the BS 1 and the RS 2, DL retransmission processing when one RS 2 relays communications between the BS 1 and the MS 3 will be described with reference to the sequence diagram depicted in FIG. 7. FIG. 7 illustrates processing when an error occurs in a transmission of HARQ data from the RS 2 to the MS 3, and the HARQ data is retransmitted from the RS 2 to the MS 3.

The BS 1 transmits scheduling (SCH) information to the RS 2 for transmitting (relaying) HARQ data #1 on a wireless link between the RS 2 and the MS 3 on a DL burst specified in the DL/UL MAP (Steps A1 and A2), and transmits the HARQ data #1 to the RS 2 on a DL burst specified in the DL/UL MAP (Step A3).

Here, the above-described scheduling information at least includes information on relay of transmission data (HARQ data), i.e., allocation information on a region (burst) that is to be used by the BS 1 and the RS 2 for communications on wireless link (wireless frame) between the RS 2 and the MS 3.

In addition, the DL/UL MAP includes information indicating on which regions (DL bursts) are to be used for transmitting the scheduling information and HARQ data, respectively, on the wireless link (wireless frame) between the BS 1 and the RS 2.

Thus, the RS 2 is enabled to receive the scheduling information and the HARQ data by carrying out reception processing on a DL burst indicated by the DL/UL MAP received from the BS 1, and to control communication (burst allocation, i.e., generation of a DL/UL MAP to the MS 3) with the MS 3 based on the received scheduling information.

Once the RS 2 receives the HARQ data from the BS 1 based on the above-described DL/UL MAP received from the BS 1 as well as obtaining scheduling information between the RS 2 and the MS 3, the RS 2 generates an RS 2-MS 3 DL/UL MAP based on the scheduling information and transmits it to the MS 3. The RS 2 transmits the HARQ data #1 received from the BS 1 to the MS 3 on the DL burst indicated by the DL/UL MAP (Steps A4 and A5). In addition, the RS 2 transmits information (ACK) indicating that the HARQ data #1 from the BS 1 can be successfully received (decoded) (reception success) to the BS 1 that is the origin of the HARQ data #1 (Step A7).

The MS 3 receives the HARQ data #1 by carrying out reception processing on the DL burst indicated by the DL/UL MAP received from the RS 2. If an error occurs in the HARQ data #1 which is beyond the correctable range and the HARQ data #1 cannot be successfully received (decoded) (Step A6), the MS 3 transmits information indicating the error (reception failure) (NAK) to the RS 2 (Step A8).

On the other hand, once the BS 1 receives the above-described ACK (completion of reception) from the RS 2 after transmitting the HARQ data #1 to the RS 2, the BS 1 transmits subsequent HARQ data (new data) #2. That is, similar to the transmission of the previous HARQ data #1, the BS 1 generates scheduling information for relaying the HARQ data #2 and burst allocation information (DL/UL MAP) of the scheduling information, and transmits the information and the HARQ data #2 to the RS 2 (Steps A9, A10, and A11). Here, the BS 1 carries out transmission without waiting for receiving a response (ACK or NAK) for the HARQ data #1 from the MS 3 via the RS 2.

Once the RS 2 receives scheduling information for the new HARQ data #2 and the HARQ data #2 based on the DL/UL MAP received from the BS 1 and receives a NAK (retransmission request) for the above-described the HARQ data #1 transmitted from the MS 3, the RS 2 transmits (retransmits) the immediate previous HARQ data #1 to the MS 3, instead of relaying the HARQ data #2 received from the BS 1 to the MS 3, and buffers the newly received HARQ data #2 to the HARQ buffer 24.

The RS 2 generates a DL/UL MAP for the MS 3 based on the scheduling information received from the BS 1. Upon generating, the RS 2 updates information for retransmission of the HARQ data #1, rather than new transmission of the HARQ data #2 (update of the above-described AI_SN that is flag information), and transmits this DL/UL MAP and the immediate previous HARQ data #1 to the MS 3 (Steps A13 and A14). This enables an immediate retransmission of the HARQ data #1.

The MS 3 receives the HARQ data #1 again by carrying out reception processing on the DL burst indicated by the DL/UL MAP received from the RS 2, and when the HARQ data #1 is successfully received (decoded), the MS 3 transmits the success (ACK) to the RS 2 (Step A16).

During this time, the RS 2 transmits (relays) a NAK for the HARQ data #1 received from the MS 3 in the above-described Step A8 to the BS 1 (Step A12), and transmits (responses with) a reception result (ACK in this example) of the new HARQ data #2 received from the RS 2 to the BS 1 (Step A15).

On the other hand, when the BS 1 receives a reception result (NAK) at the MS 3 for the HARQ data #1 from the RS 2, the BS 1 generates scheduling information for relay of the immediate previous HARQ data #2 and burst allocation information (DL/UL MAP) on the wireless link with the RS 2 for the scheduling information and transmits them to the RS 2, without transmitting new HARQ data #3 (Steps A17 and A18).

The RS 2 receives these DL/UL MAPs and scheduling information. At this time, since the RS 2 has received the reception result (ACK) for the HARQ data #1 that was transmitted by MS 3 in the above-described Step A16, the RS 2 transmits (relays) this ACK to the BS 1 (Step A19), generates a DL/UL MAP for the HARQ data #2 based on the scheduling information received from the BS 1, and transmits the HARQ data #2 buffered in the HARQ buffer 24 to the MS 3 on the DL burst indicated by that DL/UL MAP (Steps A20 and A21).

Note that if a reception result of the HARQ data #1 that is transmitted by the MS 3 in the above-described Step A16 is again a NAK, the RS 2 modifies the DL/UL MAP for the HARQ data #2 to the DL/UL MAP for the HARQ data #1, as described in the above-described Steps S13 and S14, and transmits this DL/UL MAP and the HARQ data #1 to the MS 3.

(Detailed Example of UL Processing)

Next, details on UL processing in a case in which one RS 2 relays communications between the BS 1 and the MS 3 (two-hop system) will be explained with reference to FIGS. 8-12.

(Processing at BS 1)

FIG. 8 illustrates an example of processing operations of the BS 1 (BS control unit 15) for the RS 2.

More specifically, the BS 1 transmits scheduling information that directs the MS 3 to sequentially transmit HARQ data to the RS 2. Scheduling information is transmitted to the RS 2 irrespective of the reception status at the RS 2 or the reception status at the BS 1.

In addition, for the RS 2, when the immediate previous HARQ data is successfully received, relay of new HARQ data from the RS 2 is requested (Status S0). However, when the immediate previous HARQ data cannot be successfully received at the RS 2 or when the BS 1 fails to receive the immediate previous HARQ data, retransmission of that HARQ data is requested to the RS 2 (Statuses S1 and S2).

(Processing at RS 2)

FIG. 9 illustrates an example of processing operations of the RS 2 (RS control unit 25) for the MS 3.

More specifically, the RS 2 determines processing on the MS 3 in accordance with the reception status of the HARQ data from the MS 3 and the reception status of the retransmission request from the BS 1 for the HARQ data that is relayed to the BS 1 (carries out the processing in accordance with two Statuses S0 and S1 managed by the RS status management unit 253).

Figure 10:
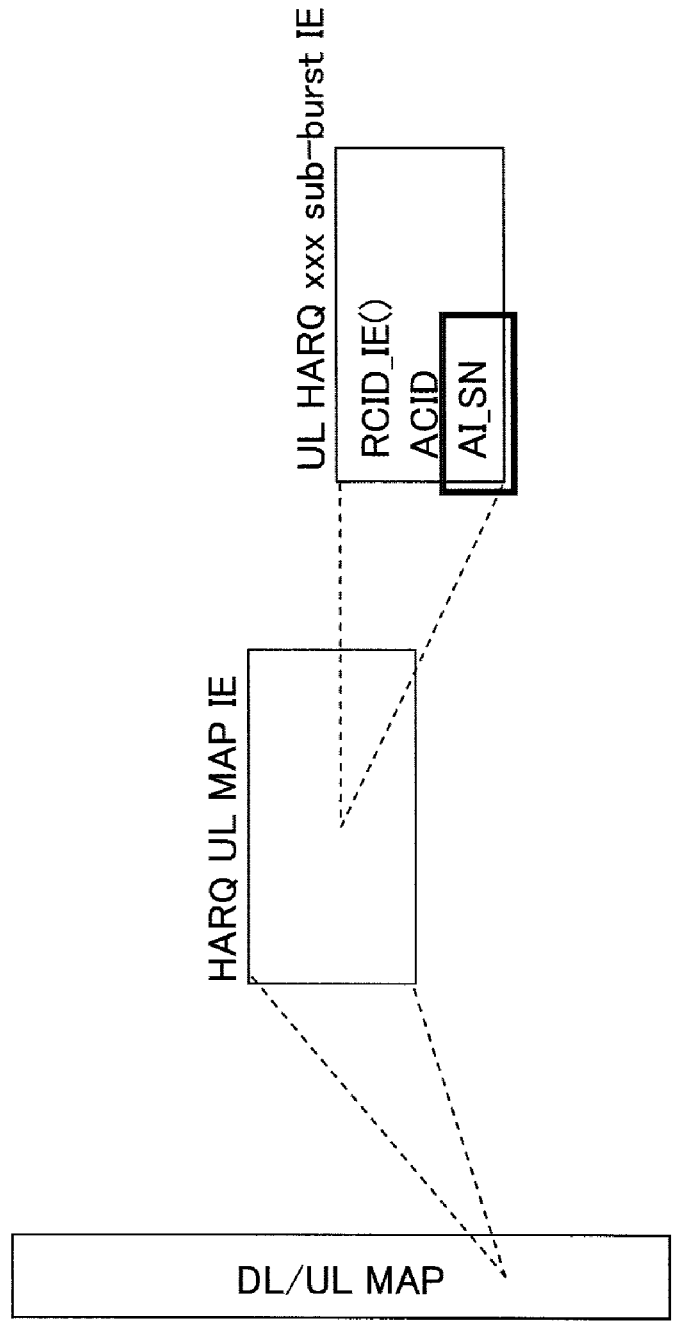
FIG. 10 is a diagram depicting the format of DL/UL MAP for in updating flag information (AI_SN) in DL processing by the RS depicted in FIG. 3.

One example of a DL/UL MAP transmitted from the RS 2 to the MS 3 is illustrated in FIG. 10.

The DL/UL MAP includes a HARQ UL MAP IE that is transmission request information of UL HARQ data in a wireless frame. The HARQ UL MAP IE includes UL HARQ xxx sub-burst that includes identification information (RCI-D_IE) of the MS 3, information indicating the channel number of the HARQ data (ACID), information indicating whether the transmission is a new transmission or a retransmission (AI_SN), and the like. Note that "xxx" represents a method of the HARQ, such as, Chase, IR CTC, or the like.

When the RS 2 receives scheduling information from the BS 1 and generates a DL/UL MAP, the RS 2 updates information in the IE regarding HARQ data according to the reception status of the HARQ data from the MS 3. Specifically, the RS 2 updates an AI_SN indicating whether the transmission of the HARQ data is a new transmission or a retransmission. The possible values of AN_SI is "0" or "1," and AN_SI is set to the value that is different from the previous value when the HARQ data is successfully received and new HARQ data is made to be transmitted, and is set to the same value as the previous value when reception of the HARQ data fails and retransmission is to be made.

Accordingly, when the RS 2 is requested for relay of new HARQ data from the BS 1 at Status S0 in which HARQ data from the MS 3 is successfully received, the RS 2 requests transmission of new HARQ data to the MS 3 (with AI_SN inversion). On the other hand, retransmission of the immediate previous HARQ data is request from the BS 1, the RS 2 requests retransmission of the immediate previous HARQ data that has been successfully received to the MS 3. This is for restrict buffer overflow of HARQ data from the HARQ buffer 24 in the RS 2.

On the other hand, in Status S1 in which the RS 2 fails to receive HARQ data from the MS 3, the RS 2 always requests retransmission of HARQ data to the MS 3 (no AI_SN inversion). Note that the processing from the RS 2 to the BS 1 is carried out in accordance with the request from the BS 1. That is, HARQ data is retransmitted when retransmission is requested from the BS 1, while new HARQ data is relayed when new transmission is requested. Here, when there is no HARQ data to be transmitted to the BS 1, that is, reception of the HARQ data from the MS 3 has failed at the RS 2, a reception failure of the HARQ data from the MS 3 is notified to the BS 1 without carrying out transmission of the HARQ data.

(UL Retransmission Control Sequence in Two-hop System)

Next, assuming the above-described operations (UL processing) of the BS 1 and the RS 2, UL retransmission processing when one RS 2 relays communications between the BS 1 and the MS 3 will be described with reference to the sequence diagram depicted in FIGS. 11 and 12. Note that FIG. 11 illustrates processing when an error occurs in a transmission of HARQ data between the RS 2 and the MS 3, and the HARQ data is retransmitted from the MS 3. FIG. 12 illustrates processing when an error occurs in a transmission of HARQ data between the RS 2 and the BS1, and the HARQ data is retransmitted from the RS2.

(When Error Occurs Transmission between RS 2 and MS 3)

As depicted in FIG. 11, the BS 1 transmits scheduling (SCH) information on a wireless link between the RS 2 and the MS 3, as information for relaying transmission data (HARQ data) #1 from MS 3 at the RS 2, to the RS 2 (Steps B1 and B2).

Here, the scheduling information at least includes information regarding relay of transmission data (HARQ data) from the MS 3, i.e., allocation information on which burst is to be used for communication by the RS 2 and the MS 3 on the wireless link (wireless frame) between the RS 2 and the MS 3, more specifically, allocation information on a UL burst to be used by MS 3 for transmitting the HARQ data to RS 2. In addition, the DL/UL MAP at least includes information indicating on which region (DL burst) is to be used for transmitting the scheduling information on the wireless link between the BS 1 and the RS 2.

Thus, the RS 2 is enabled to receive the above-described scheduling information by carrying out reception processing on the DL burst indicated by the DL/UL MAP, and to control communication (UL burst allocation) with the MS 3 based on the received scheduling information.

That is, the RS 2 generates a DL/UL MAP that is to be used for transmitting HARQ data on the wireless link with the MS 3 (information indicating on which UL burst is to be used by the MS 3 for transmitting the HARQ data #1) based on the scheduling information received from the BS in this manner, and transmits it to MS 3 (Step B3).

Once the MS 3 receives the DL/UL MAP from the RS 2, the MS 3 transmits the HARQ data #1 to the RS 2 on the UL burst allocated in the DL/UL MAP (Step B5).

On the other hand, during this time, the BS 1 allocates a region (UL burst) used by the RS 2 for relaying the HARQ data #1 to the BS 1 using the DL/UL MAP, and requests relay (transmission) of the HARQ data #1 at the RS 2 (Step B4).

Once the RS 2 receives the HARQ data #1 from the MS 3, the RS 2 carries out error correction decoding. As a result, if the decoding is successfully carried out, the RS 2 notifies the BS 1 with a reception success (ACK) for the HARQ data #1. If an error occurs in the HARQ data #1 which is beyond the correctable range and the HARQ data #1 cannot be successfully received (Step B6), the RS 2 notifies the BS 1 with information indicating that reception of the HARQ data #1 from the MS 3 has failed (NAK) (Step B9).

On the other hand, during this time, the BS 1 generates scheduling information for transmission of the HARQ data #2 and burst allocation information (DL/UL MAP) of the scheduling information and transmits them to the RS 2 at the subsequent opportunity for transmitting scheduling information without waiting for receiving a reception result of the HARQ data #1 (ACK or NAK) at the RS 2 (Steps B7 and B8).

Once the RS 2 receives DL burst (scheduling information) allocated by this DL/UL MAP, in theory, the RS 2 should generate and transmit a DL/UL MAP for transmission of the HARQ data #2 based on the scheduling information. However, since the RS 2 has failed to receive the HARQ data #1, the RS 2 requests retransmission of the previous (immediate previous) HARQ data #1, instead of requesting transmission of new HARQ data #2.

That is, the RS 2 generates a DL/UL MAP requesting retransmission of the previous (immediate previous) HARQ data #1 based on the scheduling information for transmission of new HARQ data #2 from the BS 1, and transmits this DL/UL MAP to the MS 3 (Step B10). Thereby, the MS 3 retransmits the HARQ data #1 to the RS 2 on a UL burst specified by this DL/UL MAP (Step B12).

Note that, during this time, since the BS 1 recognizes that the RS 2 has failed to receive the HARQ data #1 from the MS 3 by the reception of the above-described NAK (Step B9), the BS 1 requests relay of the immediate previous HARQ data #1, rather than the new HARQ data #2, using DL/UL MAP to the RS 2 (Step B11), and does not carry out reception processing on the reception area (UL burst) allocated by the DL/UL MAP for transmission of the HARQ data #1.

Once the RS 2 receives the HARQ data #1 that is retransmitted from the MS 3, the RS 2 carries out error correction decoding on the HARQ data. As a result, when decoding is carried out successfully, the RS 2 transmits (relays) the HARQ data #1 to the BS 1, and notifies a reception success (ACK) (Steps B15 and B16). Note that if the HARQ data #1 received from the MS 3 cannot be successfully received again this time, similar to the above-described Step B9, the RS 2 notifies the BS 1 with a NAK.

On the other hand, during this time, the BS 1 generates scheduling information in the subsequent opportunity (cycle) for transmitting scheduling information and transmits it to the RS 2 on the DL burst specified in the DL/UL MAP without waiting for receiving HARQ data from the RS 2 and a reception result (ACK or NAK). Since the BS 1 recognizes that reception of the HARQ data #1 has failed, the BS 1 transmits scheduling information for retransmission of the immediate previous HARQ data #2, rather than transmission of new HARQ data #3, on the DL burst specified in the DL/UL MAP (Steps B13 and B14).

The RS 2 generates a DL/UL MAP requesting transmission of the immediate previous HARQ data #2 based on the scheduling information received on the DL burst specified by this DL/UL MAP, and transmits it to the MS 3 (Step B17). Thereby, the MS 3 transmits the HARQ data #2 to the RS 2 on a UL burst specified by this DL/UL MAP.

As described above, the BS 1 continuously transmits scheduling information for transmission of subsequent HARQ data to the RS 2 at cyclic transmission opportunities (transmission opportunities in every three frames in FIG. 11) without waiting for relay of HARQ data from the RS 2 (notification of a reception result) (see the above-described Steps B2, B8, and B14). Thus, it is possible for the MS 3 to continuously receive DL/UL MAPs from the RS 2 according to such a cycle, thereby allowing continuously transmission of HARQ data.

In addition, when an error occurs between the MS 3 and the RS 2 during transmission of the HARQ data, a DL/UL MAP is generated for retransmission of the previous HARQ data based on the scheduling information for transmitting (relaying) new HARQ data received at the RS 2 from the BS 1 (see the above-described Step B10). Thus, it is possible for the MS 3 to receive DL/UL MAPs from the RS 2 at the above-described cycle irrespective of presence/absence of the above-described transmission error, which enables immediate transmission of HARQ data at the reception cycle.

(When Error Occurs Transmission between BS 1 and RS 2)

As depicted in FIG. 12, the RS 2 successfully receives HARQ data #1 from the MS 3, and relays the HARQ data #1 to the BS 1. On the other hand, the BS 1 transmits scheduling information for transmission of new HARQ data #2 from the MS 3 to the RS 2 on the region (DL burst) specified in the DL/UL MAP (Steps B21 and B22), and thereafter, receives the HARQ data #1 from the RS 2 (Step B23), as well as receiving a reception result (ACK) for the HARQ data #1 at the RS 2 sent by the MS 3 (Step B25).

The BS 1 executes error correction decoding on the HARQ data #1 received from the RS 2. If the BS 1 cannot succeed in decoding since an error exceeding the correctable range occurs (Step B24), the BS 1 generates a DL/UL MAP requesting retransmission of the HARQ data #1 and transmits it to the RS 2 (Step B27).

On the other hand, the RS 2 receives scheduling information for transmitting the new HARQ data #2 from the BS 1, generates burst allocation information (DL/UL MAP) used by the MS 3 for transmitting the HARQ data #2 based on the scheduling information, and transmits it to the MS 3 (Step B26). Upon receiving this DL/UL MAP, the MS 3 transmits the HARQ data #2 to the RS 2 in the UL burst specified by that DL/UL MAP (Step B28).

Although the RS 2 receives the HARQ data #2, since the RS 2 has received the retransmission request for the immediate previous HARQ data #1 from the BS 1, the RS 2 retransmits the immediate previous HARQ data #1 to the BS 1, instead of transmitting the HARQ data #2 (Step B31). The RS 2 also transmits a reception result (ACK) at the RS 2 for the HARQ data #1 sent by the MS 3 to the BS 1 (Step B32).

On the other hand, without waiting for receiving the HARQ data from the RS 2 and receiving the reception result at the RS 2 for the HARQ data, the BS 1 transmits a DL/UL MAP and scheduling information at the subsequent opportunity (cycle) for transmitting scheduling information to the RS 2. Since the BS 1 has not successfully received the HARQ data #1, however, the BS 1 generates scheduling information for transmission of the immediate previous HARQ data #2, rather than new HARQ data #3, and transmits it to the RS 2 on the region (DL burst) specified in the DL/UL MAP (Steps B29 and B30).

The RS 2 receives the scheduling information for the HARQ data #2 (Step S30), generates burst allocation information (DL/UL MAP) for allocating a transmission region (UL burst) for the HARQ data #2 based on the scheduling information, transmits it to the MS 3 (Step B33), and receives the HARQ data #2 from the MS 3 in that UL burst (Step B35).

At this time, although the RS 2 has received the HARQ data #2 successively at the above-described Step B28, buffer overflow from the HARQ buffer 24 may occur if the RS 2 would direct the MS 3 to transmit the new HARQ data #3. Thus, the RS 2 prevents buffer overflow by invoking retransmission of the immediate previous HARQ data #2.

The BS 1 then requests the RS 2 to transmit (relay) the HAQR data #2 using a DL/UL MAP (Step B34), and the RS 2 transmits the HARQ data #2 received from the MS 3 to the BS 1 (Step B38), as well as transmitting a reception result (ACK) for the HARQ data #2 (Step B39).

On the other hand, without waiting for receiving the HARQ data #2 and the reception result from the RS 2, the BS 1 transmits scheduling information for transmission of the new HARQ data #3 from the MS 3 in the region (DL burst) specified in the DL/UL MAP to the RS 2 at the subsequent an opportunity to transmit (cycle) (Steps B36 and B37). The RS 2 generates allocation information (DL/UL MAP) for a transmission region (UL burst) for the HARQ data #3 based on the scheduling information, and transmits it to the MS 3 (Step B40). Thereby, the MS 3 transmits the new HARQ data #3 to the RS 2 on a UL burst specified by this DL/UL MAP.

As described above, even when an error occurs during transmission of UL HARQ data between the BS 1 and the RS 2, the BS 1 updates (modifies) the DL/UL MAP in accordance with a reception result of HARQ data to be transmitted to the RS 2 to the RS 2 transmit. Thus, it is possible for the MS 3 to continuously receive DL/UL MAPs from the RS 2 in such a cycle, and to immediately retransmit HARQ data in the reception cycle.

(B) Second Embodiment

Next, processing (DL processing and UL processing) in a second embodiment will be described in which HARQ data that is transmitted from the BS 1 to the MS 3 (the MS 3-3, in the example depicted in FIG. 1) is relayed by multiple (two, for example) RSs 2-1 (#1) and 2-2 (#2).

(Detailed Example of DL Processing)

First, details on DL processing in a case in which two RSs 2 (#1 and #2) relay communications between the BS 1 and the MS 3 (three-hop system) will be explained with reference to FIGS. 13-15.

(Processing at BS 1)

FIG. 13 illustrates an example of processing operation at the BS 1 (BS control unit 15) when an opportunity to transmit HARQ data is given to the RS 2.

As depicted in FIG. 13, the BS 1 (BS control unit 15) manages eight statuses S0-S7 at the BS status management unit 153 (status management table) and carries out DL processing according to these statuses S0-S7. That is, the BS 1 trucks the reception status of HARQ data at the RS 2 and the MS 3 (that is, the status of a response received from the RS 2 and the MS 3 for HARQ data), and determines processing to be carried out next (transmission of new HARQ data, transmission of the HARQ data, and transmission of scheduling information for relay) from that status.

The BS 1 looks up different response results for each of the RS 2 and the MS 3 upon executing subsequent processing since there is a delay in receiving a response for HARQ data from a RS 2 and a MS 3 when multiple RSs 2 are involved in communication with the BS 1.

That is, as depicted in FIG. 13, responses for HARQ data that are looked up when an opportunity to transmit HARQ data #(n+1) is given are as follows: a response for the immediate previous HARQ data #n for the RS #1, a response for the second previous HARQ data #(n−1) for the RS #2, and a response for the third previous HARQ data #(n−2) for the MS #3.

When the BS 1 is given an opportunity to transmit new HARQ data # (n+1), responses for HARQ data transmissions by each of the RSs #1 and #2, and the MS #3 are looked up, and the HARQ data #(n+1) is transmitted only in the case where all results are ACKs (completion of reception). On the other hand, transmission of the HARQ data fails between the RSs #1 and #2, or between the RS #2 and the MS #3, scheduling information is generated such that retransmission is carried out in the failed unit, and is sent to both the RS #1 and RS #2. If transmission of the HARQ data has failed between the BS 1 and the RS #1, HARQ data from the BS 1 is retransmitted.

(Processing at RS 2)

On the other hand, FIG. 14 illustrates an example of processing operation at the RS 2 (RS control unit 25) when scheduling information is received, or scheduling information and HARQ data are received from the BS 1.

As depicted in FIG. 14, the RS 2 fundamentally carries out the same processing as the processing in the first embodiment. When the destination of the HARQ data is the RS 2 (#2), processing is carried out after result of the response from the subsequent RS #2 is checked.

(DL Retransmission Control Sequence in Three-hop System)

Figure 15:
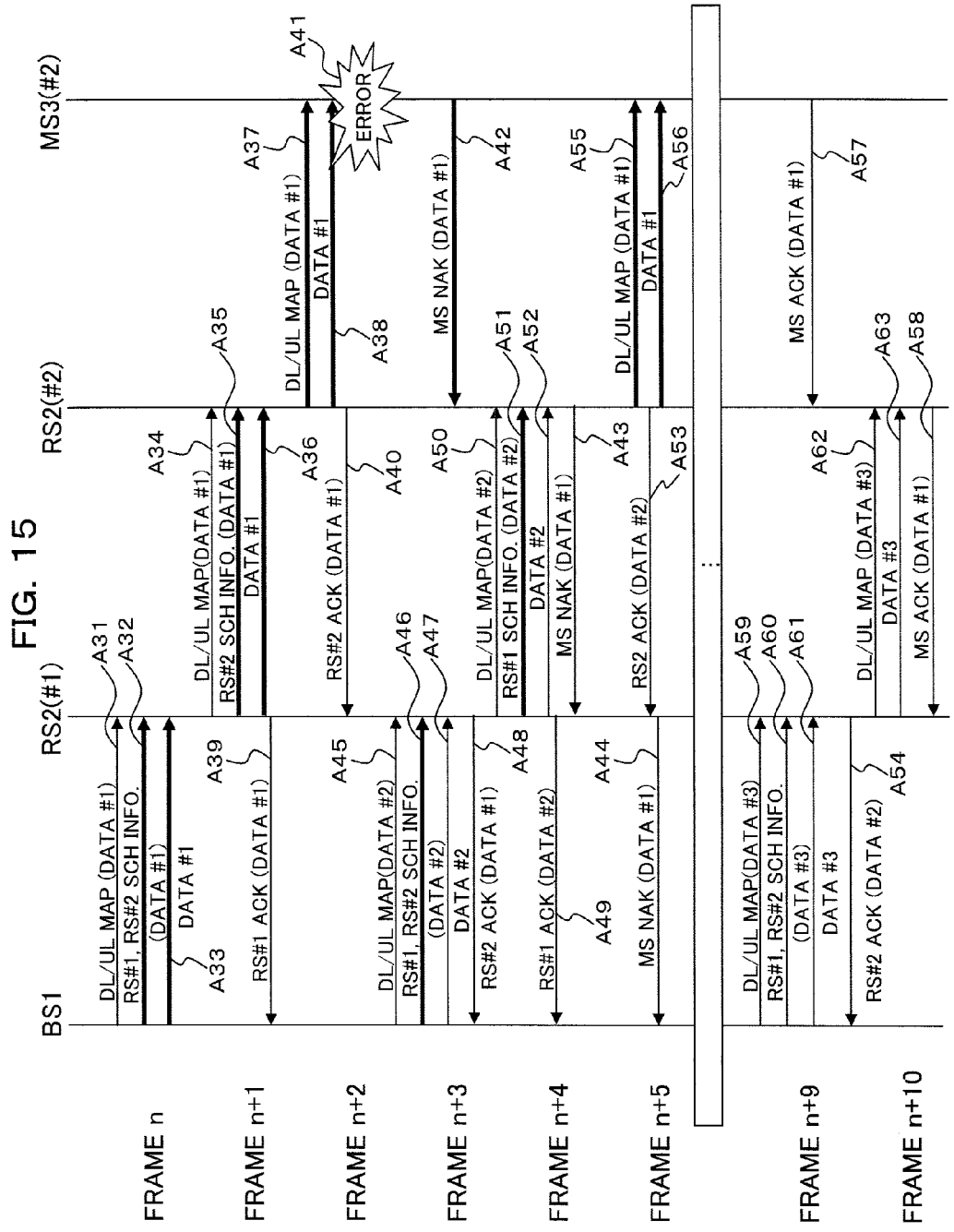
FIG. 15 is a sequence diagram illustrating DL retransmission processing in the wireless relay system depicted in FIG. 1 (in the case of a three-hop system)

Next, assuming the above-described operations (DL processing) of the BS 1 and the RS 2, a sequence of DL retransmission processing when two RS #2 and #2 relay communications between the BS 1 and the MS 3 is illustrated in FIG. 15. FIG. 15 illustrates a processing sequence (Steps A31-A64) when an error occurs in a transmission of HARQ data from the RS #2 to the MS #3, and retransmission is carried out from the RS 2 to the MS 3.

Here, the sequence will be described by focusing the essential portion of the processing in this example. Similar to the DL processing in the first embodiment, before receiving a response for HARQ data transmission from the MS #3, the BS 1 begins to transmit new HARQ data (Steps A45-A47, and A59-A61).

The MS #3 fails to receive the HARQ data #1 from the RS #2 (Step A41), and transmits a NAK (retransmission request) to the RS #2 (Step A42).

In the meantime, the BS 1 transmits new HARQ data #2 to the RS #1 (Steps A45-A47), and the RS #1 relays the new HARQ data #2 to the RS #2 (Steps A50-A52).

When the RS #2 receives the NAK (retransmission request) from the MS #3 (Step A42), the RS #2 retransmits the immediate previous HARQ data #1 to the MS #3, instead of transmitting the new HARQ data #2 received from the RS #1 to the MS #3 (Steps A55 and A56). The RS #2 then buffers the new HARQ data #2 received from the RS #1 in the HARQ buffer 24.

In the meantime, the BS 1 receives a NAK (retransmission request) for the HARQ data #1 by the MS #3 (Steps A43 and A44). When the BS 1 is given an opportunity to transmit new HARQ data #4, the BS 1 checks a reception status at the RS #1 for the HARQ data #3, a reception status at the RS #2 for the HARQ data #2, and a reception status at the MS 3 for the HARQ data #1 to determine whether or not to transmit the HARQ data #4.

In this example, the BS 1 identifies HARQ data buffered in the HARQ buffer 24, stops the transmission of the HARQ data #4 at an opportunity to transmit the HARQ data #4 in the frame # (n+9), and transmits scheduling information for transmission of the HARQ data #3 between the RS #2 and the MS #3 (Steps A59-A61). The RS #2 receives that scheduling information (Steps A62 and A63), and transmits the HARQ data #2 buffered in the HARQ buffer 24 to the MS #3.

(Detailed Example of UL Processing)

Next, details on UL processing in a case in which two RSs 2 (#1 and #2) relay communications between the BS 1 and the MS 3 (three-hop system) will be explained with reference to FIGS. 16-18.

(Processing at BS 1)

FIG. 16 illustrates an example of processing operations of the BS 1 (BS control unit 15) for the RS 2.

As depicted in FIG. 16, similar to the UL processing at the BS 1 in the first embodiment, the BS 1 (BS control unit 15) manages three statuses S0, S1, and S2 at the BS status management unit 153 (status management table), and carries out processing in accordance with the status. That is, the BS 1 in this case periodically carries out allocation for HARQ data transmission irrespective of the error occurrence situations between the RSs #1 and #2, and between the RS #2 and the MS #3.

(Processing at RS 2)

On the other hand, as depicted in FIG. 17, for example, the RS 2 (RS control unit 25) manages two statuses S0 and S1 at the RS status management unit 253 (status management table) in accordance with a reception status for the HARQ data from the MS 3 (OK or NG) and a reception status for retransmission request for the immediate previous HARQ data from the BS 1, and carries out processing in accordance with these Statuses S0 and S1.

That is, the RS 2 generates a DL/UL MAP for the next allocation for transmitting HARQ data to the RS 2 or to the MS 3 which is periodically allocated, considering a reception status for the previous HARQ data. For example, if an error occurs when receiving the immediate previous HARQ data, the AI_SN in the generated DL/UL MAP is set to the same value as the value of the AI_SN in the immediate previous DL/UL MAP and retransmission is requested to the lower node. On the other hand, when reception of the immediate previous HARQ data has succeeded, the AI_SN in the generate DL/UL MAP is set to the inversion of the value of the AI_SN in the immediate previous DL/UL MAP and transmission of new HARQ data is requested to the lower node.

(UL Retransmission Control Sequence in Three-hop System)

Figure 18:
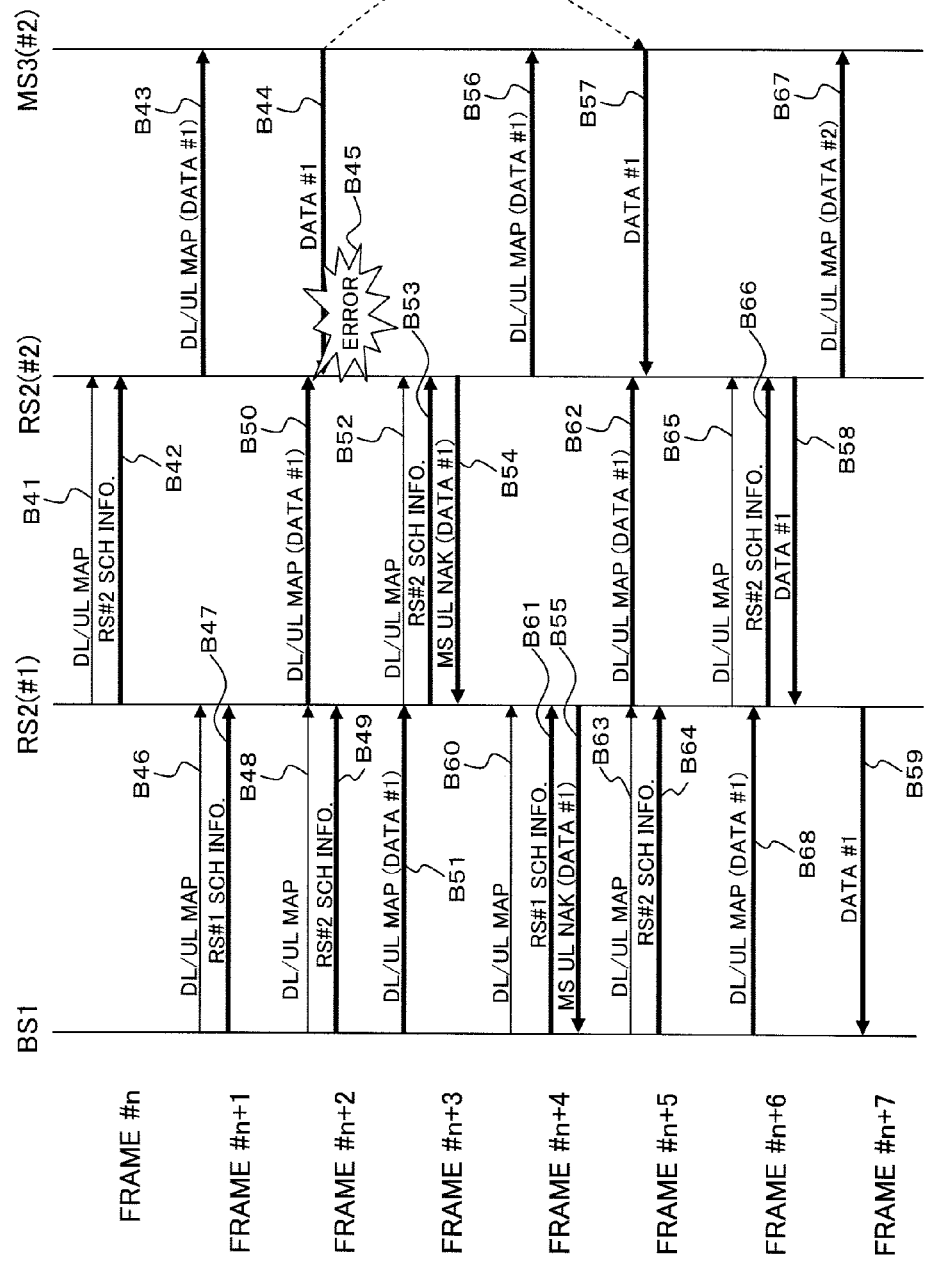
FIG. 18 is a sequence diagram illustrating UL retransmission processing in the wireless relay system depicted in FIG. 1 (in the case of a three-hop system)
Figure 19:
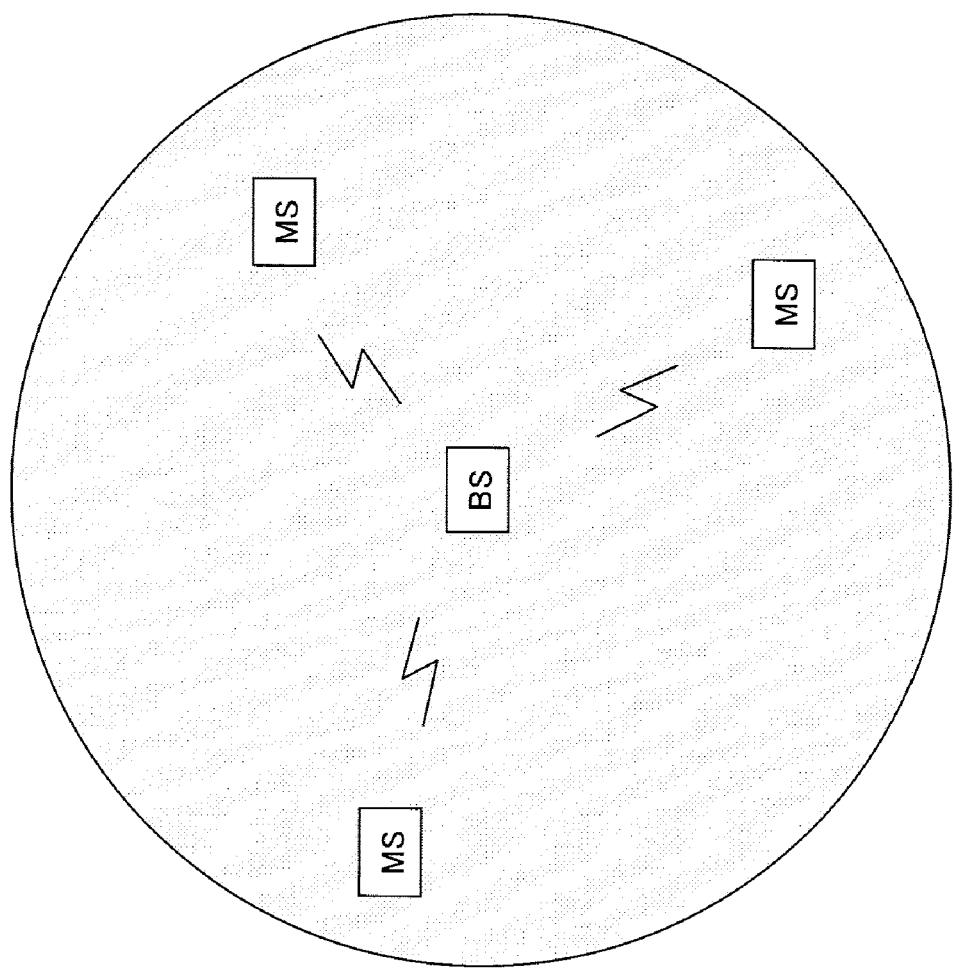
FIG. 19 is a diagram illustrating an example of a configuration of a wireless communication system compliant to the IEEE802.16d/e.

Next, assuming the above-described operations (UL processing) of the BS 1 and the RS 2, a sequence of UL retransmission processing when two RS #1 and #2 relay communications between the BS 1 and the MS 3 is illustrated in FIG. 18. FIG. 18 illustrates a processing sequence (Steps B41-B67) when an error occurs in a transmission of HARQ data between the RS #2 and the MS #3, and retransmission is carried out from the MS 3.

Here, the sequence will be described by focusing the essential portion of the processing in this example. The RS #2 generates a DL/UL MAP requesting transmission of the HARQ data from the MS #3 based on scheduling information received from the upper-level RS #1, and transmit it to the MS #3. Thereby, when the RS #2 receives the HARQ data from the MS #3 (Steps B41-B44), the RS #2 decodes the HARQ data and notifies the BS 1 with the decoding result (NAK in FIG. 18) (Steps B45, B54, and B55).

If there are enough resources to be allocated to the MS #3 and to the RS #2, the BS 1 carries out allocations for transmission of HARQ data substantially at regular intervals (Steps B46-B49, B60, B61, B63, and B64).

The RS 2 generates and transmits a DL/UL MAP used by the MS #3 for transmitting HARQ data on the lower-level wireless link based on scheduling information received from the BS 1 or the upper-level RS 2 (Steps B50, B52, B53, B62, B65, and B66).

The BS 1 assumes transmission of new HARQ data when generating scheduling information. When an error occurs in transmission of the immediate previous HARQ data with respect to the adjacent transmission of HARQ data from the RS 2 or the MS 3 (Step B45), the RS 2 updates the DL/UL MAP based on scheduling information that is periodically received for retransmission of HARQ data (requests transmission of the immediate previous HARQ data).

(Notes)

Note that processing at each of the BS 1 and at the RS 2 in the two-hop and three-hop systems described above is fundamentally the same except for the following points:

(DL)

BS 1: the number of responses that are looked up increases with an increase in the hop count.

RS 1: the maximum number of pieces of HARQ data buffered with an increase in the hop count.

(UL)

RS 2: the maximum number of pieces of HARQ data buffered with an increase in the hop count.

The present invention provides at least one of effects or advantages listed below:

(1) Since the wireless base station (BS) can transmit new data without waiting for a reception result regarding data from a lower-level wireless relay station (RS) or a wireless terminal (MS), it is possible to carry out data continuous transmissions to the wireless terminal.

(2) In addition, on a path in the direction from the BS to the MS (downlink), even when an error occurs in data, the RS can generate and retransmit allocation information on a wireless resource for retransmitting data that is transmitted previously (second allocation information) based on allocation information on a wireless resource for transmitting (relaying) new data received from the BS (first allocation information). Thus, retransmission of data requested from the RS or the MS can be immediately carried out. Accordingly, it is possible to reduce delays in retransmission processing regardless of the number of RSs between the BS and the MS.

(3) On the other hand, for ULs, the BS transmits allocation information on a wireless resource for transmitting data to the RS (first allocation information) regardless whether data is received from the RS or the MS. Thus, the RS can continuously relay data by requesting retransmission of data or transmission of new data from the subordinate RS or the MS based on data reception result.

As described in detail above, the present invention is considered as quite useful in the field of wireless communication technology since delays in retransmission processing in a wireless relay system can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A method of retransmission control in a wireless relay system that relays data from a wireless base station to a wireless terminal via one or a plurality of wireless relay stations, the method comprising:
    on the wireless base station or a wireless relay station that is closer to the wireless terminal than the wireless base station,
    transmitting new data and first allocation information on a wireless resource for transmitting the new data on a wireless link from a lower-level wireless relay station that is located downstream of the wireless base station or the wireless relay station that is closer to the wireless terminal than the wireless base station to the wireless terminal;
    on a marked relay station that is a wireless relay station that receives the first allocation information and the new data,
    checking, upon generating second allocation information for transmitting the received data to the lower-level wireless relay station or the wireless terminal based on the first allocation information, a reception result from the lower-level wireless relay station or the wireless terminal for previous transmission data;
    generating the second allocation information for retransmitting the previous transmission data based on the first allocation information when the reception result is a reception failure; and
    transmitting the second allocation information and the previous transmission data to the lower-level wireless relay station or the wireless terminal, and buffering the new data.

2. The method of retransmission control in a wireless relay system according to claim 1, wherein
    the marked relay station generates the second allocation information for transmitting the new data to the lower-level wireless relay station or the wireless terminal based on the first allocation information when the reception result is a reception success, and transmits the second allocation information and the new data to the lower-level wireless relay station or the wireless terminal.

3. The method of retransmission control in a wireless relay system according to claim 1, wherein the marked relay station checks, when newly receiving the first allocation information while buffering the new data, upon generating the second allocation information based on the first allocation information, a reception result from the lower-level wireless relay station or the wireless terminal for previous transmission data, generates the second allocation information for transmitting the new buffered data when the reception result is a reception success, and transmits the second allocation information and the buffered new data to the lower-level wireless relay station or the wireless terminal.

4. The method of retransmission control in a wireless relay system according to claim 1, wherein the marked relay station generates, when there is an error in the new data, the second allocation information for retransmitting the previous transmission data, irrespective of whether the reception result for the previous transmission data is a reception success or a reception failure, and transmits the second allocation information to the lower-level wireless relay station or the wireless terminal.

5. The method of retransmission control in a wireless relay system according to claim 4, wherein the marked relay station transmits the second allocation information and the previous transmission data to the lower-level wireless relay station or the wireless terminal only when the reception result for the previous transmission data is a reception failure.

6. The method of retransmission control in a wireless relay system according to claim 1, wherein the marked relay station generates, upon generating the second allocation information based on the first allocation information, the second allocation information by updating flag information in the first allocation information indicating whether data transmission is a new transmission or a retransmission.

7. The method of retransmission control in a wireless relay system according to claim 1, wherein the wireless base station transmits the first allocation information for transmitting the new data, and the new data without waiting for reception of a reception result from the lower-level wireless relay station or the wireless terminal for the previous transmission data.

8. The method of retransmission control in a wireless relay system according to claim 7, wherein the wireless base station generates, when the reception result is a reception failure upon receiving the reception result for the previous transmission data, the first allocation information for making the wireless relay station retransmit the previous transmission data, and transmits that first allocation information to the wireless relay station.

9. The method of retransmission control in a wireless relay system according to claim 8, wherein the wireless base station suspends transmission of the new data when the reception result is a reception failure.

10. A method of retransmission control in a wireless relay system that transmits data from a wireless terminal to a wireless base station via one or a plurality of wireless relay stations, the method comprising:
on the wireless base station or a wireless relay station that is closer to the wireless terminal than the wireless base station,
transmitting first allocation information on a wireless resource for making a lower-level wireless relay station that is located downstream of the wireless base station or the wireless relay station that is closer to the wireless terminal than the wireless base station or the wireless relay station transmit data from the wireless terminal, on a wireless link from the lower-level wireless relay station to the wireless terminal, to the lower-level wireless relay station;
on a marked relay station that is a wireless relay station that receives the first allocation information,
checking, upon generating the second allocation information for transmitting a lower-level wireless relay station that is located downstream of the marked relay station or the wireless terminal based on the first allocation information, a reception result for data previously received from the lower-level wireless relay station or the wireless terminal; and
generating, when the reception result is a reception failure, the second allocation information for making the lower-level wireless relay station or the wireless terminal to retransmit the previously received data, and transmitting that second allocation information to the lower-level wireless relay station or the wireless terminal.

11. The method of retransmission control in a wireless relay system according to claim 10, wherein the marked relay station generates, when the reception result is a reception success, the second allocation information for making the lower-level wireless relay station or the wireless terminal to transmit new data, and transmits that second allocation information to the lower-level wireless relay station or the wireless terminal.

12. The method of retransmission control in a wireless relay system according to claim 10, wherein the marked relay station transmits the reception result to the upper-level wireless relay station or the wireless base station.

13. The method of retransmission control in a wireless relay system according to claim 10, wherein the marked relay station buffers the new data, when retransmission of previous data that has been received from the lower-level wireless relay station or the wireless terminal is requested by a upper-level wireless relay station that is located upstream of the marked relay station or the wireless base station, on receiving new data from the lower-level wireless relay station or the wireless terminal, and transmits the previous data to the upper-level wireless relay station or the wireless base station.

14. The method of retransmission control in a wireless relay system according to claim 13, wherein the marked relay station generates, when retransmission of previous data is requested by the upper-level wireless relay station or the wireless base station while buffering the new data, the second allocation information for making the lower-level wireless relay station or the wireless terminal retransmit the buffered new data based on the first allocation information, and transmits that second allocation information to the lower-level wireless relay station or the wireless terminal.

15. The method of retransmission control in a wireless relay system according to claim 10, wherein the marked relay station generates, upon generating the second allocation information based on the first allocation information, the second allocation information by updating flag information in the first allocation information indicating whether data transmission is a new transmission or a retransmission.

16. A wireless relay station in a wireless relay system that relays data from a wireless base station to a wireless terminal via one or a plurality of wireless relay stations, the wireless relay station comprising:
reception unit that receives new data and first allocation information on a wireless resource for transmitting the new data on a wireless link from the local wireless relay station to the wireless terminal or a lower-level wireless relay station, from the wireless base station or an upper-level wireless relay station that is closer to the wireless base station than the local wireless relay station;
a buffer that buffers the new data and previous transmission data;
allocation information generation unit that generates second allocation information for transmitting received data, to the wireless terminal or a lower-level wireless relay station that is closer to the wireless terminal than the local wireless relay station, based on the first allocation information;
control unit that controls the allocation information generation unit to generate the second allocation information for retransmitting the previous transmission data based on the first allocation information when a reception result from the lower-level wireless relay station or the wireless terminal for previous transmission data is a reception failure and to make the buffer the new data; and
transmission unit that transmits the second allocation information and the previous transmission data to the lower-level wireless relay station or the wireless terminal.

17. A wireless base station in a wireless relay system that relays data from a wireless base station to a wireless terminal via one or a plurality of wireless relay stations, the wireless base station comprising:
allocation information generation unit that generates first allocation information on a wireless resource for transmitting new data from a lower-level wireless relay station that is located downstream of the local wireless base station to the wireless terminal; and
transmission unit that transmits the first allocation information and the new data to the lower-level wireless relay station or the wireless terminal without waiting for reception of a reception result from the lower-level wireless base station or the wireless terminal for previous transmission data.

18. A wireless relay station in a wireless relay system that transmits data from a wireless terminal to a wireless base station via one or a plurality of wireless relay stations, the wireless relay station comprising:
reception unit that receives first allocation information on a wireless resource for causing data to be transmitted from the wireless terminal, on a wireless link from the local wireless relay station to the wireless terminal, from an upper-level wireless relay station that is closer to the wireless base station than the local wireless relay station or the wireless base station;
allocation information generation unit that generates second allocation information for transmission to the wireless terminal or a lower-level wireless relay station that is closer to the wireless terminal than the local relay station, based on the first allocation information;

control unit that controls the allocation information generation unit to generate the second allocation information for causing previously received data to be retransmit when a reception result for the previously received data from the lower-level wireless relay station or the wireless terminal is a reception failure; and transmission unit that transmits the second allocation information to the lower-level wireless relay station or the wireless terminal.

19. A wireless relay station that transmits, to a wireless terminal, received data from a wireless base station directed to the wireless terminal, the wireless relay station comprising:

a reception unit that receives, from the wireless base station side, first data directed to the wireless terminal and first allocation information on a wireless resource for transmitting data to the wireless terminal; and a transmission unit that transmits allocation information on a wireless resource generated according to the first allocation information and the first data to the wireless terminal using a wireless resource allocated according to the first allocation information, wherein the transmission unit, when the reception unit receives, from the wireless base station side, second data directed to the wireless terminal and second allocation information on a wireless resource for transmitting data to the wireless terminal and when it is detected that the transmission of the first data has failed, retransmits the first data by transmitting, to the wireless terminal, allocation information on a wireless resource generated according to the second allocation information and the first data using a wireless resource allocated according to the second allocation information.

20. A wireless base station in a wireless relay system that transmits data from a wireless terminal to the wireless base station via one or a plurality of wireless relay stations, the wireless base station comprising:

allocation information generation unit that generates first allocation information on a wireless resource for transmitting data from the wireless base station on a wireless link from the local wireless base station to the wireless terminal; and transmission unit that transmits the first allocation information to a lower-level wireless relay station that is located downstream of the local wireless base station or the wireless terminal, irrespective of whether data is received from the lower-level wireless relay station or the wireless terminal.

* * * * *